United States Patent
Matsumoto et al.

(10) Patent No.: US 6,871,019 B2
(45) Date of Patent: Mar. 22, 2005

(54) SHUTTER ABNORMALITY DETECTION APPARATUS FOR CAMERA

(75) Inventors: Hisayuki Matsumoto, Hachioji (JP); Yoichiro Okumura, Hino (JP); Toshiaki Ishimaru, Hino (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/436,533

(22) Filed: May 13, 2003

(65) Prior Publication Data

US 2004/0101299 A1 May 27, 2004

(30) Foreign Application Priority Data

May 15, 2002 (JP) ........................................ 2002-140274
Jun. 17, 2002 (JP) ........................................ 2002-175881

(51) Int. Cl.[7] ................................................. G03B 7/00
(52) U.S. Cl. ....................................... 396/235; 396/479
(58) Field of Search ............................... 396/235, 236, 396/479–482

(56) References Cited

U.S. PATENT DOCUMENTS

| | | | |
|---|---|---|---|
| 5,257,056 A | | 10/1993 | Kazumi |
| 5,457,514 A | * | 10/1995 | Hasuda et al. .............. 396/273 |
| 5,758,213 A | | 5/1998 | Goto et al. |
| 5,835,800 A | * | 11/1998 | Goto et al. ................. 396/235 |

* cited by examiner

Primary Examiner—David M. Gray
(74) Attorney, Agent, or Firm—Volpe and Koenig, P.C.

(57) ABSTRACT

A shutter abnormality detection apparatus for a camera includes a shutter including leading and trailing curtains which are shutter curtains electrically controlled to run. A curtain run detection unit detects a run state of at least one of the leading and trailing curtains. A curtain run time judgment unit judges a run time of the shutter curtains based on an output from the curtain run detection unit. An abnormality processing unit notifies an abnormality state of the shutter curtains, when it is judged as a result of judgment in the curtain run time judgment unit that the curtain run time is abnormal.

7 Claims, 19 Drawing Sheets

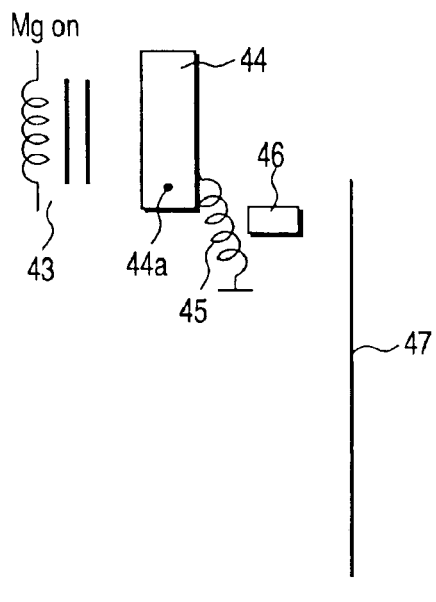
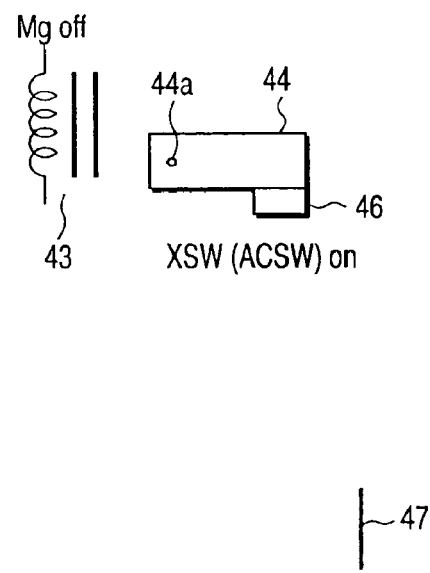
FIG. 4A    FIG. 4B
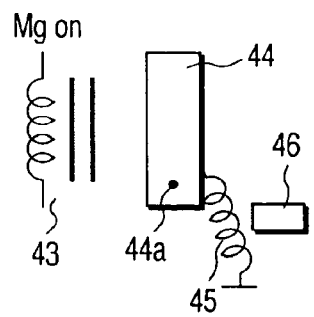
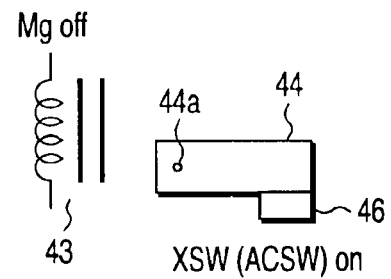
FIG. 5A    FIG. 5B

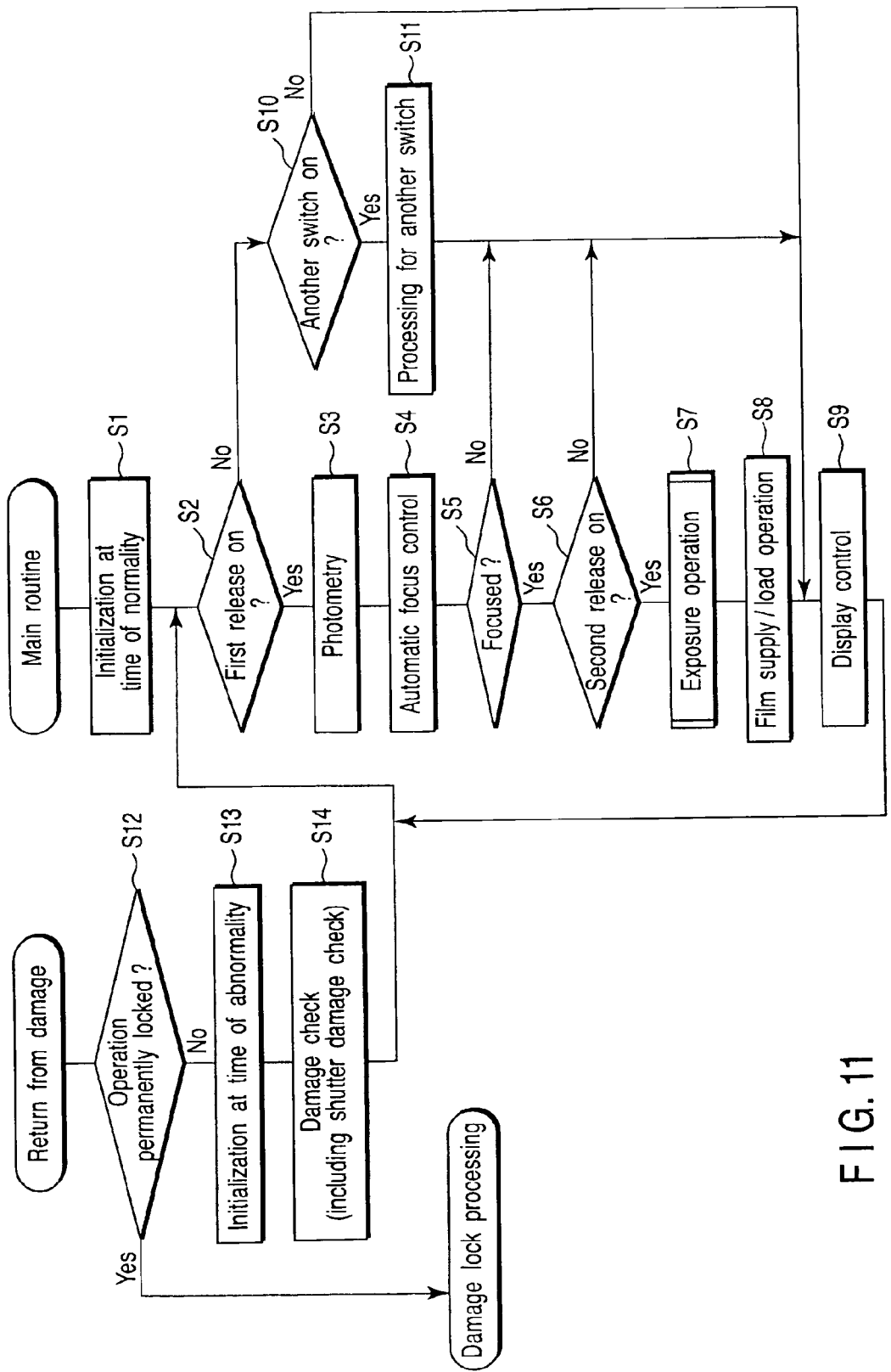
F I G. 11

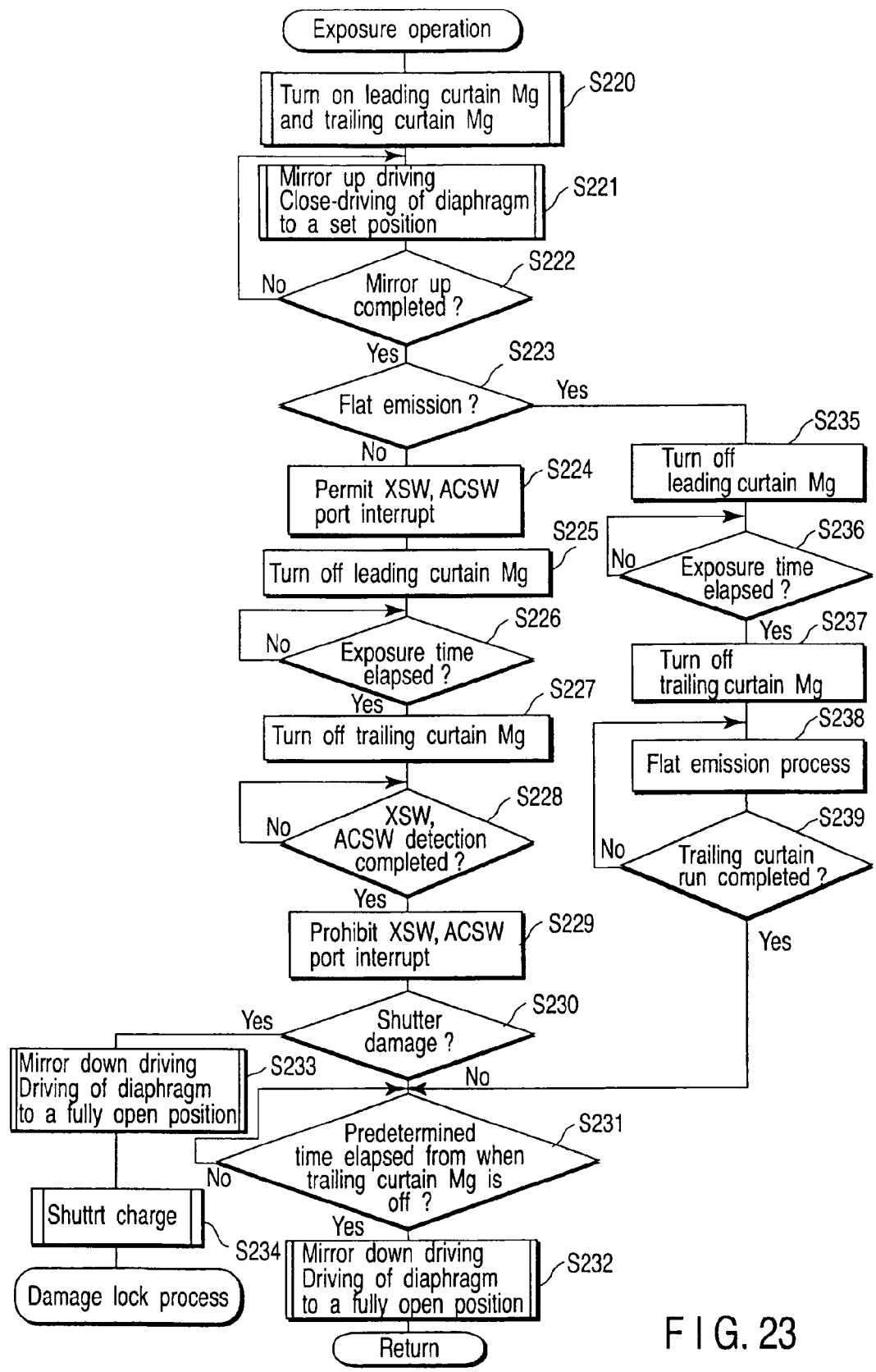
F I G. 23

SHUTTER ABNORMALITY DETECTION APPARATUS FOR CAMERA

CROSS-REFERENCE TO RELATED APPLICATIONS

This application is based upon and claims the benefit of priority from the prior Japanese Patent Applications No. 2002-140274, filed May 15, 2002 and 2002-175881, filed Jun. 17, 2002, the entire contents of which are incorporated herein by reference.

BACKGROUND OF THE INVENTION

1. Field of the Invention

The present invention relates to a shutter abnormality detection apparatus for a camera.

2. Description of the Related Art

A camera on which a focal plane shutter is mounted has heretofore been known. In this camera, an electric control type shutter is used which includes two curtains of leading and trailing curtains and which electrically runs the leading and trailing curtains to control the shutter.

In this electric control type shutter, it is known that an abnormal operation of the shutter is electrically detected and warning is given.

A typical shutter abnormality is "non-exposure", and this abnormality indicates that a photograph is not exposed despite of a release operation performed by a photographer.

There are roughly two causes for generation of the non-exposure. One is that dust, and the like adhere to an attracting surface of a magnet engaging the leading and trailing curtains and the magnet causes an attraction defect. The other is that a driving mechanism of the shutter curtain becomes defective or the shutter curtain per se is deformed and the shutter curtain cannot run.

For a trouble of the non-exposure, the abnormality is not found until a film is developed. This is a large trouble for the camera. Therefore, some techniques of the warning of the abnormality at a photographing time have been proposed.

For example, in U.S. Pat. No. 5,257,056, a leading curtain detection switch and a trailing curtain detection switch are disposed, and a predetermined warning is issued, when the abnormality of the curtain is detected before/after driving the shutter. In U.S. Pat. No. 5,758,213, a reflective optical sensor is disposed in a shutter portion, and this sensor detects a run timing, exposure time or speed of the curtain and issues the warning.

The driving mechanism of the shutter varies also with a maker or a camera type. Therefore, various "defects of the driving mechanism of the shutter curtain" which are causes for the non-exposure are considered.

BRIEF SUMMARY OF THE INVENTION

According to a first aspect of the present invention, there is provided a shutter abnormality detection apparatus for a camera comprising a shutter including leading and trailing curtains which are shutter curtains electrically controlled to run, the apparatus comprising:

a curtain run detection unit which detects a run state of at least one of the leading and trailing curtains;

a curtain run time judgment unit which judges a run time of the shutter curtains based on an output from the curtain run detection unit; and an abnormality processing unit which notifies an abnormality state of the shutter curtains, when it is judged as a result of judgment in the curtain run time judgment unit that the curtain run time is abnormal.

Moreover, a second aspect of the present invention relates to the shutter abnormality detection apparatus for the camera according to the first aspect of the present invention, and the abnormality processing unit includes an operation lock function which locks the subsequent operation of the camera, when the curtain run time is judged to be abnormal.

Furthermore, a third aspect of the present invention relates to the shutter abnormality detection apparatus for the camera according to the second aspect of the present invention, and further comprises: a return unit which returns the operation of the camera from the locked state in response to a predetermined operation, when the subsequent operation of the camera is locked by the abnormality processing unit; a curtain run time recheck unit which again judges whether or not the run time of the shutter curtain is normal during the operation of return by the return unit; and a control unit which returns the operation of the camera to a normal operation, when the run time of the shutter curtain is judged to be normal as a result of judgment by the curtain run time recheck unit and which controls and locks the subsequent operation of the camera, when the run time of the shutter curtain is again judged to be abnormal.

Additionally, a fourth aspect of the present invention relates to the shutter abnormality detection apparatus for the camera according to the third aspect of the present invention, and the predetermined operation includes an operation of a power switch or an attachment/detachment operation of a power battery.

Moreover, a fifth aspect of the present invention relates to the shutter abnormality detection apparatus for the camera according to the third aspect of the present invention, and the curtain run time recheck unit controls the operation so that the trailing curtain starts running ahead of the leading curtain so as to prevent a useless exposure operation.

Furthermore, a sixth aspect of the present invention relates to the shutter abnormality detection apparatus for the camera according to the first aspect of the present invention. The curtain run time judgment unit compares the run time of the shutter curtain detected by the curtain run time judgment unit with a normal range value, and judges that the run of the shutter curtain is abnormal, when the curtain run time is shorter or longer than the normal range value.

Additionally, a seventh aspect of the present invention relates to the shutter abnormality detection apparatus for the camera according to the first aspect of the present invention. The shutter is brought into a charge completion state, when the leading and trailing curtains of the mechanically charged shutter are held by an electromagnet against an urging spring, and the apparatus further comprises a control unit which controls timings for releasing the holding of the leading and trailing curtains by the electromagnet in the charge completion state and which drives the leading and trailing curtains of the shutter by an action of the urging force to allow an exposure operation.

Moreover, according to an eighth aspect of the present invention, there is provided a shutter abnormality detection apparatus for a camera comprising a shutter including leading and trailing curtains which are shutter curtains electrically controlled to run, the apparatus comprising:

a leading curtain run detection unit which detects a run state of the leading curtain of the shutter;

a trailing curtain run detection unit which detects the run state of the trailing curtain of the shutter;

an exposure time determination unit which determines an appropriate exposure time in accordance with an object situation;

a clocking unit which measures a time from the run completion of the leading curtain detected by the leading curtain run detection unit until the run completion of the trailing curtain detected by the trailing curtain run detection unit; and an abnormality processing unit which judges that the run of the shutter curtain is abnormal and which notifies an abnormality state, when the time measured by the clocking unit is not in a range of a calculated value obtained by a predetermined calculation of the exposure time and a predetermined time.

Moreover, a ninth aspect of the present invention relates to the shutter abnormality detection apparatus for the camera according to the second aspect of the present invention, and the predetermined time is a time in a range of ±1 to ±3 msec.

Furthermore, a tenth aspect of the present invention relates to the shutter abnormality detection apparatus for the camera according to the eighth aspect of the present invention, and the predetermined time is a time value of a fluctuation error allowed for a logically appropriate exposure time.

Additionally, according to an eleventh aspect of the present invention, there is provided a shutter abnormality detection apparatus for a camera comprising a shutter including leading and trailing curtains which are electrically controlled to run, the apparatus comprising:

a leading curtain run detection unit which detects completion of the run of the leading curtain of the shutter;

a trailing curtain run detection unit which detects the completion of the run of the trailing curtain of the shutter;

a measurement unit which measures beforehand a time difference between a time required for the run of the leading curtain at a normal operation time and a time required for the run of the trailing curtain;

a storage unit comprising a nonvolatile memory which stores the time difference measured by the measurement unit as a correction value;

a clocking unit which measures a time from the run completion of the leading curtain detected by the leading curtain run detection unit until the run completion of the trailing curtain detected by the trailing curtain run detection unit; and an abnormality processing unit which judges that the run of either the leading curtain or the trailing curtain is abnormal and which notifies an abnormality state, when a time value measured by the clocking unit is not in a range of a calculated value obtained by addition/subtraction of a predetermined time with respect to a calculated value obtained by a predetermined calculation of a time difference between a time of run start of the leading curtain and a time of run start of the trailing curtain and the correction value.

Moreover, according to a twelfth aspect of the present invention, there is provided a shutter abnormality detection apparatus for a camera comprising a shutter including leading and trailing curtains which are electrically controlled to run, the apparatus comprising:

a leading curtain run detection unit which detects completion of the run of the leading curtain of the shutter;

a trailing curtain run detection unit which detects the completion of the run of the trailing curtain of the shutter;

a storage unit comprising a nonvolatile memory which stores a calculated value of calculation based on a time required for the run of the leading curtain at a normal operation time and a time required for the run of the trailing curtain as a correction value;

a clocking unit which measures a time from the run completion of the leading curtain detected by the leading curtain run detection unit until the run completion of the trailing curtain detected by the trailing curtain run detection unit; and an abnormality processing unit which judges that the run of either the leading curtain or the trailing curtain is abnormal and which notifies an abnormality state, when a time value measured by the clocking unit is not in a predetermined range of a calculated value obtained by a predetermined calculation of a theoretical time from run start of the leading curtain until the run start of the trailing curtain and the correction value.

Furthermore, according to a thirteenth aspect of the present invention, there is provided a shutter abnormality detection apparatus for a camera comprising a shutter including leading and trailing curtains which are electrically controlled to run, the apparatus comprising:

a leading curtain run detection unit which outputs a run completion signal of the leading curtain of the shutter;

a trailing curtain run detection unit which outputs the run completion signal of the trailing curtain of the shutter; and a shutter abnormality judgment unit which detects a state of the run completion signal outputted from the other curtain run detection unit based on the run completion signal from either one of the leading and trailing curtain run detection units and which judges abnormality of the shutter based on a detection result.

Additionally, a fourteenth aspect of the present invention relates to the shutter abnormality detection apparatus for the camera according to the thirteenth aspect of the present invention. The shutter abnormality judgment unit judges that the shutter is abnormal, when the leading curtain run detection unit outputs a run incompletion signal at an output time of the run completion signal of the trailing curtain run detection unit or when the trailing curtain run detection unit outputs the run completion signal at the output time of the run completion signal of the leading curtain run detection unit.

Moreover, a fifteenth aspect of the present invention relates to the shutter abnormality detection apparatus for the camera according to the thirteenth aspect of the present invention. The apparatus further comprises: a shutter speed calculation unit which calculates an opening time of the shutter based on an object luminance, and a prohibition unit which prohibits an operation of the shutter abnormality judgment unit, when the shutter speed is lower than a predetermined speed.

Furthermore, according to a sixteenth aspect of the present invention, there is provided a shutter abnormality detection apparatus for a camera comprising a shutter including leading and trailing curtains which are shutter curtains electrically controlled to run, the apparatus comprising:

a first detection unit which detects a change of a level of a signal indicating a run state of the leading curtain of the shutter;

a second detection unit which detects the change of the level of the signal indicating the run state of the trailing curtain of the shutter; and a shutter abnormality judgment unit which compares a detection timing of the level change by the first detection unit with that of the level change by the second detection unit and which judges that the run of the shutter curtain is abnormal, when the detection timing of the level change by the second detection unit is earlier than that of the level change by the first detection unit.

Additionally, according to a seventeenth aspect of the present invention, there is provided a shutter abnormality detection apparatus for a camera comprising a shutter including leading and trailing curtains which are shutter curtains electrically controlled to run, the apparatus comprising:

a strobe unit which irradiates an object;

a shutter abnormality judgment unit which judges whether or not the shutter is abnormal based on a run state of the shutter curtain;

a flat light emitting unit which allows the strobe unit to emit light in a flat state from start of an opening operation of the shutter until the shutter is closed; and a prohibition unit which prohibits the operation of the shutter abnormality judgment unit, when the flat light emitting unit is controlled.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A, 4B are schematic views showing states of an XSW 39, ACSW 40, and shutter curtain 47 at a normal operation time;

FIGS. 5A, 5B are schematic views showing the states of the XSW 39, ACSW 40 and shutter curtain 47 at an abnormal operation time;

FIG. 11 is a flowchart showing an operation of the whole camera which is a main control of a CPU 35;

FIG. 23 is a flowchart showing details of the step S7 (exposure operation) of FIG. 11;

DETAILED DESCRIPTION OF THE INVENTION

First Embodiment

Figure 1:
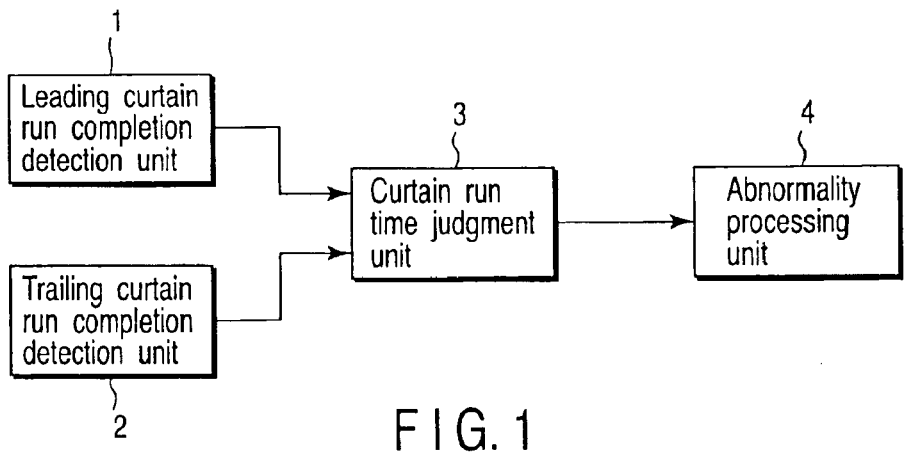
FIG. 1 is a block diagram schematically showing a shutter abnormality detection apparatus for a camera according to a first embodiment of the present invention.

A first embodiment of the present invention will be described hereinafter with reference to the drawings. FIG. 1 is a block diagram schematically showing a shutter abnormality detection apparatus for a camera according to the present invention.

In FIG. 1, a leading curtain run completion detection unit 1 is a unit for detecting completion of run of a leading curtain of a focal plane shutter, and a trailing curtain run completion detection unit 2 is a unit for detecting the completion of the run of a trailing curtain of the focal plane shutter. Detection outputs of the leading curtain run completion detection unit 1 and trailing curtain run completion detection unit 2 are supplied to a curtain run time judgment unit 3. Furthermore, the output of the curtain run time judgment unit 3 is supplied to an abnormality processing unit 4.

In this constitution, the leading curtain run completion detection unit 1 detects the completion of the run of the leading curtain of the focal plane shutter of the camera. Similarly, the trailing curtain run completion detection unit 2 detects the run completion of the trailing curtain of the focal plane shutter.

Moreover, a run time of the curtain is detected in the curtain run time judgment unit 3, based on a signal indicating the leading curtain run completion of the shutter detected by the leading curtain run completion detection unit 1 and a signal indicating the trailing curtain run completion of the shutter detected by the trailing curtain run completion detection unit 2. And it is judged in the curtain run time judgment unit 3 whether or not the curtain has normally run. Here, when it is judged that the run of the curtain is abnormal, abnormalities such as operation lock are processed in the abnormality processing unit 4.

Figure 2:
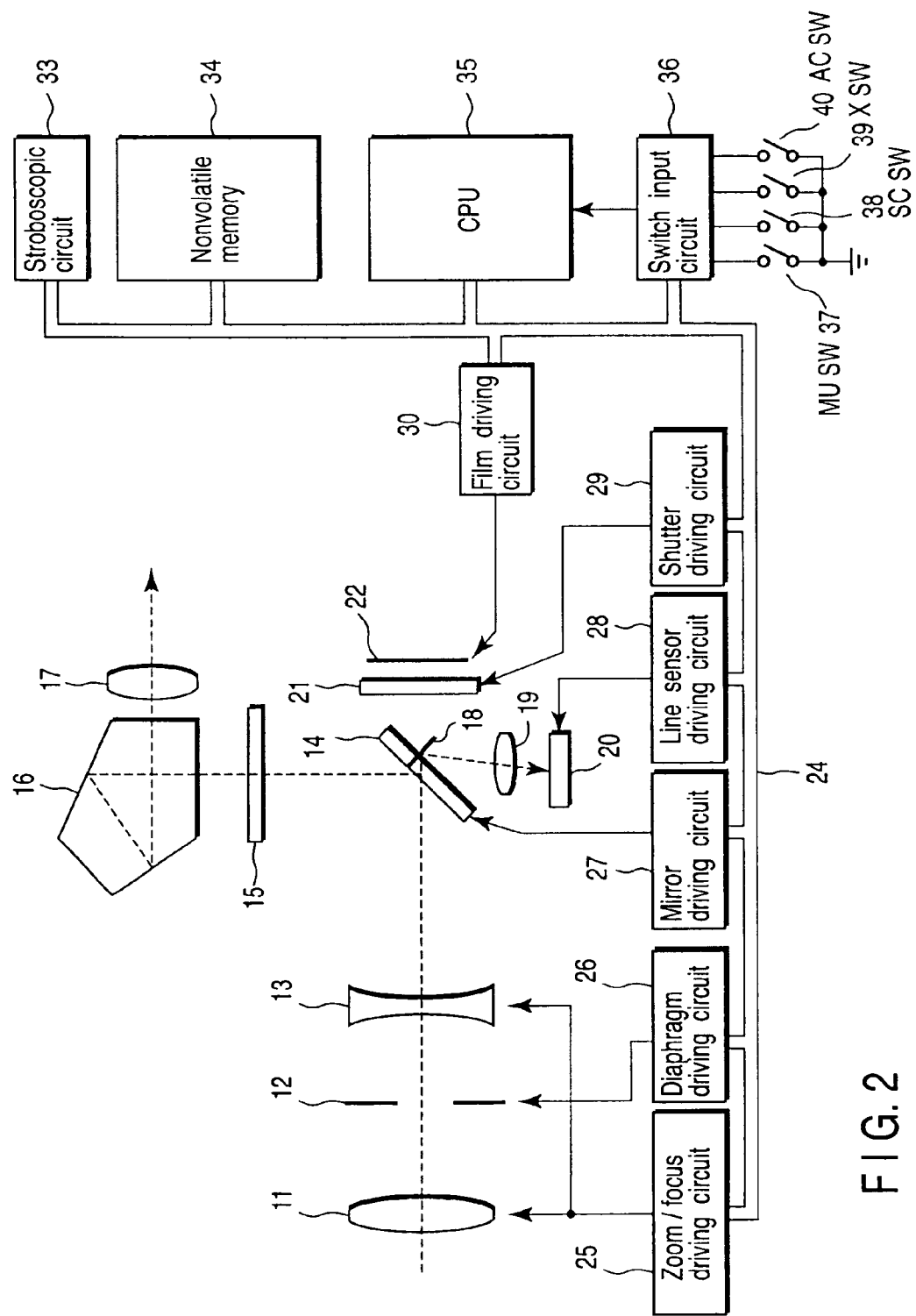
FIG. 2 is a block diagram showing a constitution of the camera to which the first embodiment of the present invention is applied.

FIG. 2 is a block diagram showing the constitution of the camera to which the first embodiment of the present invention is applied.

In FIG. 2, a photography lens for forming an object image is constituted of a positive lens 11 and negative lens 13 disposed via a diaphragm mechanism 12. That is, the diaphragm mechanism 12 is disposed in the photography lens.

A movable mirror 14 whose middle portion substantially forms a half mirror is disposed behind the negative lens 13. Moreover, an object light reflected upwards by the movable mirror 14 reaches a finder eyepiece optical system 17 via a focal plate 15 and penta prism 16.

In a middle rear surface portion of the movable mirror 14, a sub-mirror 18 is disposed so as to reflect the object light downwards. A separator optical system 19 constituted of two optical systems to separate two images is disposed in a vertical direction in the drawing which is a reflective optical axis direction of the sub-mirror 18. A line sensor 20 is disposed in an image forming position of the object image by the separator optical system 19.

Moreover, a shutter 21 and film 22 are disposed behind the movable mirror 14 as viewed from the photography lens. When the movable mirror 14 moves upwards to bring the shutter 21 in an open state, the object image is formed on the film 22 and exposed.

The shutter 21 is a known focal plane shutter, and generally mounted on the camera which is a single lens reflex camera. For the focal plane shutter, a built-in spring (not shown) is charged prior to the exposure, and the leading and trailing curtains run by an urging force of the spring.

A zoom/focus driving circuit 25 for controlling a driving source for a focus adjustment operation and zooming operation is disposed in each lens 11, 13 of the photography lens. A diaphragm driving circuit 26 is disposed in the diaphragm mechanism 12. The zoom/focus driving circuit 25 includes an encoder (not shown) which generates a signal in response to movement of each lens described above. Moreover, the focus adjustment is carried out by a CPU 35 described later based on the calculated driving amount and encoder output.

Moreover, the movable mirror 14 is driven by a mirror driving circuit 27. The line sensor 20 is similarly driven by a line sensor driving circuit 28, and the shutter 21 is driven by a shutter driving circuit 29.

The zoom/focus driving circuit 25, diaphragm driving circuit 26, mirror driving circuit 27, line sensor driving circuit 28, and shutter driving circuit 29 are connected to one another by a data bus 24. Furthermore, a film driving circuit 30 for performing a winding operation of the film 22, when the photography of one frame ends, a stroboscopic circuit 33, a nonvolatile memory 34, the CPU 35, and a switch input circuit 36 are connected to one another by the data bus 24 which transmits/receives various data.

The sub-mirror 18, separator optical system 19, line sensor 20, and the like constitute a focus detection apparatus by a known phase difference method. Moreover, the CPU 35 obtains an interval between two images based on the signal inputted via the line sensor driving circuit 28, and calculates the driving amount of the photography lens to be driven in a focused position.

It is to be noted that in the CPU 35, a diaphragm value and shutter speed of the diaphragm mechanism 12 from which appropriate exposure is obtained are calculated based on the object luminance outputted from a photometry circuit (not shown) and film sensitivity detected by a film sensitivity detection circuit (not shown). The shutter 21 is driven/controlled via the shutter driving circuit 29 at a calculated shutter speed.

An exposure time for the film 22 is determined, when the leading curtain engaged by a leading curtain magnet (not shown) and a trailing curtain engaged by a trailing curtain magnet are opened at an appropriate timing in accordance with the calculated shutter speed.

The stroboscopic circuit 33 is a circuit for object illumination, and operates as an auxiliary light, when the CPU 35 judges that the object luminance is lower than a predetermined luminance. The nonvolatile memory 34 is a memory for storing various adjustment data, operation state of the camera, and the abnormal state of the shutter 21.

The switch input circuit 36 is constituted of a plurality of switches such as an operation switch (not shown) and a detection switch of a mechanism system operation. Here, detection switches according to the present invention include: a mirror up switch (MUSW) 37 for detecting an operation state of the movable mirror 14; a shutter charge switch (SCSW) 38 for detecting a spring charge state of the shutter 21; a leading curtain detection switch (XSW) 39 for detecting the operation state of the leading curtain of the shutter 21; and a trailing curtain detection switch (ACSW) 40 for detecting the operation state of the trailing curtain of the shutter 21.

The driving operation of the above-described zoom/focus driving circuit 25, diaphragm driving circuit 26, mirror driving circuit 27, line sensor driving circuit 28, shutter driving circuit 29, film driving circuit 30, stroboscopic circuit 33, and nonvolatile memory 34 is generally controlled by the CPU 35.

Figure 3:
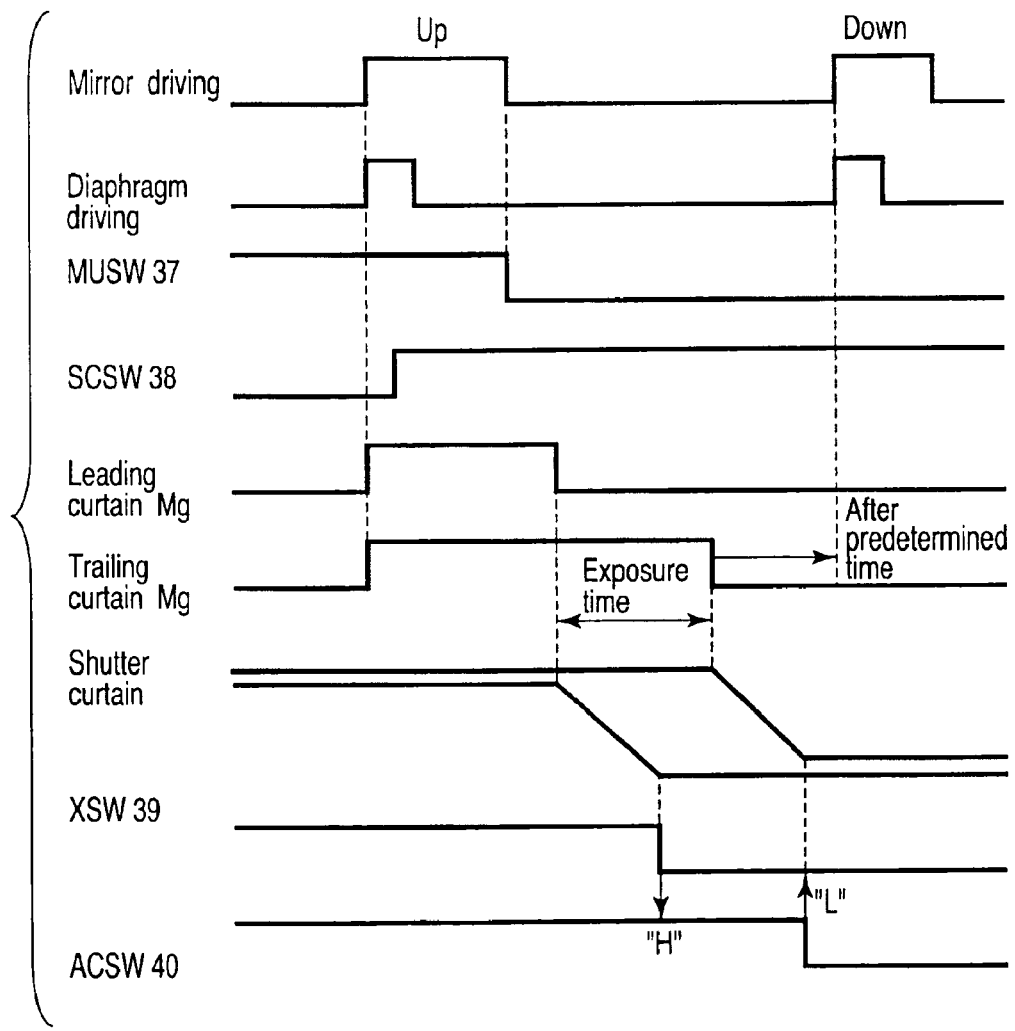
FIG. 3 is a time chart showing an operation in a case in which a shutter 21 of FIG. 2 normally operates.

FIG. 3 is a time chart showing an operation in a case in which the shutter 21 normally operates. It is to be noted that the spring (not shown) built in the shutter 21 is assumed to be already in the charged state.

First, a leading curtain magnet (Mg) for holding the leading curtain and a trailing curtain magnet (Mg) for holding the trailing curtain are turned on, and the diaphragm mechanism 12 is driven so as to move upwards the movable mirror 14 and obtain the calculated diaphragm value. When the operation of the movable mirror 14 is started, mechanical engagement of the leading and trailing curtains is released. When the leading or trailing curtain magnet is turned off, each curtain can run.

When the MUSW 37 for detecting the operation state of the movable mirror 14 changes to a "low level (L)" from a "high level (H)", the driving of the mirror is completed. At this time, a photography luminous flux passed through the positive lens 11, negative lens 13, and diaphragm mechanism 12 is incident upon the shutter 21, and the luminous flux into the finder optical system is cur off.

Next, the leading curtain magnet is turned off to run the leading curtain, and the exposure onto the film 22 is started. When the run of the leading curtain is completed, the XSW 39 changes to on ("L") from off ("H").

Furthermore, the trailing curtain magnet is turned off to run the trailing curtain, and the exposure onto the film 22 is cut off. When the run of the trailing curtain is completed, the ACSW 40 changes to off ("H") from on ("L"). Moreover, in a predetermined time (a time sufficient for completing the curtain run) after the trailing curtain magnet is off, the movable mirror 14 is moved downwards, and the diaphragm mechanism 12 is driven in a release position.

FIGS. 4A, 4B are schematic views showing the states of the XSW, ACSW, and shutter curtain at a normal operation time. In FIGS. 4A and 4B, an attracting member 44 is disposed in the vicinity of a shutter magnet 43, which rotates upwards centering on a rotation center 44a in the charged state and which is attracted by the magnet 43, when the shutter magnet 43 is turned on. This attracting member 44 is urged downwards by a spring member 45. A switch member 46 is a switch electrically turned on, when the attracting member 44 moves down by the urging of the spring member 45, and is constituted of the above-described XSW 39 or ACSW 40. It is to be noted that a reference numeral 47 denotes a shutter curtain (leading curtain or trailing curtain).

First, a shutter charge time will be described.

As shown in FIG. 4A, the shutter is charged so that the shutter can run, and the attracting member 44 rotates upwards centering on the rotation center 44a. Then, the shutter curtain also moves upwards in the drawing by an interlock mechanism (not shown) which interlocks with the rotation movement of the attracting member 44. That is, the shutter magnet 43 is turned on, the attracting member 44 is attracted, and the curtain is brought into a state in which the running is possible.

Next, a shutter run completion time will be described.

The magnet 43 is turned off from the state shown in FIG. 4A. Then, as shown in FIG. 4B, the attracting member 44 is rotated downwards centering on the rotation center 44a by the urging force of the spring member 45, and the shutter curtain 47 also runs downwards. When the attracting member 44 moves downwards, the switch member 46 interlocks and is electrically turned on. That is, the XSW 39 or ACSW 40 is turned on. In this manner, the XSW 39 or ACSW 40 interlocks with the movement of the shutter curtain 47 and attracting member 44, and is turned on.

FIGS. 5A, 5B are schematic views showing the states of the XSW 39, ACSW 40, and shutter curtain 47 at an abnormal operation time.

When the operation is normal at a shutter charge time, as shown in FIG. 4A, the shutter is charged so that the shutter can run. Then, the attracting member 44 is rotated upwards centering on the rotation center 44a, and the shutter curtain 47 should also move upwards by the interlock mechanism (not shown) which interlocks with the movement of the attracting member 44. However, some abnormalities (adhesion of dust, component defects, and the like) are generated in the interlock mechanism, and the shutter curtain 47 interlocks and does not move upwards. This state is shown in FIG. 5A. That is, the shutter is not exactly charged in the state. Even in this state, only the attracting member 44 moves upwards and is charged.

FIG. 5B is a schematic diagram of a shutter run completion time in the abnormal operation.

When the magnet 43 is turned off from the state of FIG. 5A, the attracting member 44 is rotated downwards centering on the rotation center 44a by the urging force of the spring member 45, and the XSW 39 or ACSW 40 is turned on in the same manner as in the state shown in FIG. 4B. However, since the shutter curtain 47 is originally uncharged and positioned downwards, the shutter curtain 47 is not driven at all.

That is, the XSW 39 or ACSW 40 is turned on, and it seems as if the run of the shutter curtain 47 was completed. In actual, however, the shutter curtain 47 is not driven from the beginning, and non-exposure occurs. In the shutter including a mechanism in which the shutter curtain 47 interlocks with the attracting member 44 by the interlock mechanism, such unexposed state possibly occurs.

Next, an example in which the shutter abnormally operates will be described with reference to time charts of FIGS. 6 to 10. It is to be noted that the operation at the normal time has been described with reference to the time chart of FIG. 3, and therefore only a portion changed from that at the normal time will be described.

Figure 6:
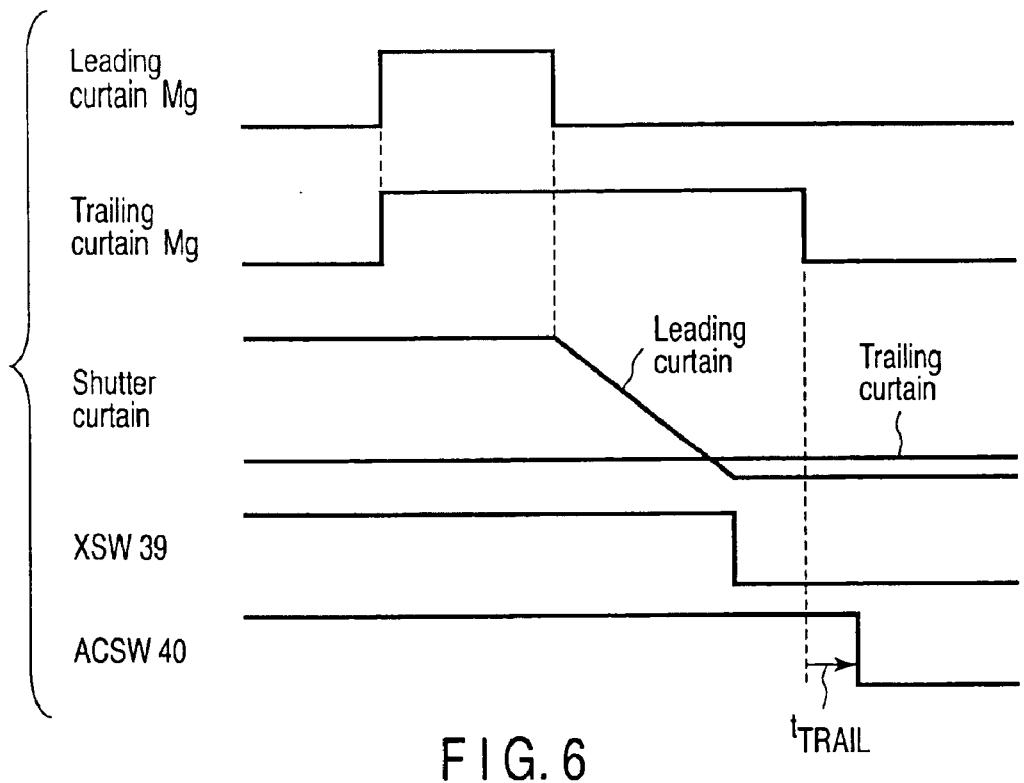
FIG. 6 is a time chart (low speed second time) showing an example in which the shutter abnormally operates and showing an operation in a case in which a leading curtain is charged but the trailing curtain is not charged.

FIG. 6 is a time chart (low speed second time) showing the operation in a case in which the leading curtain is charged but the trailing curtain is not charged.

In FIG. 6, the leading curtain interlocks with the off state of the leading curtain magnet and starts running. When the run is completed, the XSW 39 is turned on. However, the trailing curtain is not charged by disadvantages described with reference to FIGS. 5A, 5B. Even when the trailing curtain magnet is turned off, the curtain does not run at all. As described with reference to FIGS. 5A, 5B, the ACSW 40 is turned on even at this abnormal time, and a signal indicating as if the shutter curtain run were completed is outputted.

However, for the attracting member 44, since the shutter curtain 47 is not involved as the load, the load of the spring member 45 is smaller than that at the normal time. Therefore, the urging force becomes relatively strong, and the switch member 46 is turned on earlier than the normal time by the attracting member 44. That is, a time ($t_{TRAIL}$) from when the trailing curtain magnet is off until the ACSW 40 is on indicates a value smaller than that at the normal time.

Moreover, although not shown, the attracting member 44 is driven with a small load. Therefore, the attracting member 44 strikes the ACSW 40 with a force stronger than that at the normal time. Chattering at a time when the ACSW 40 is turned on is sometimes observed to be large.

Figure 7:
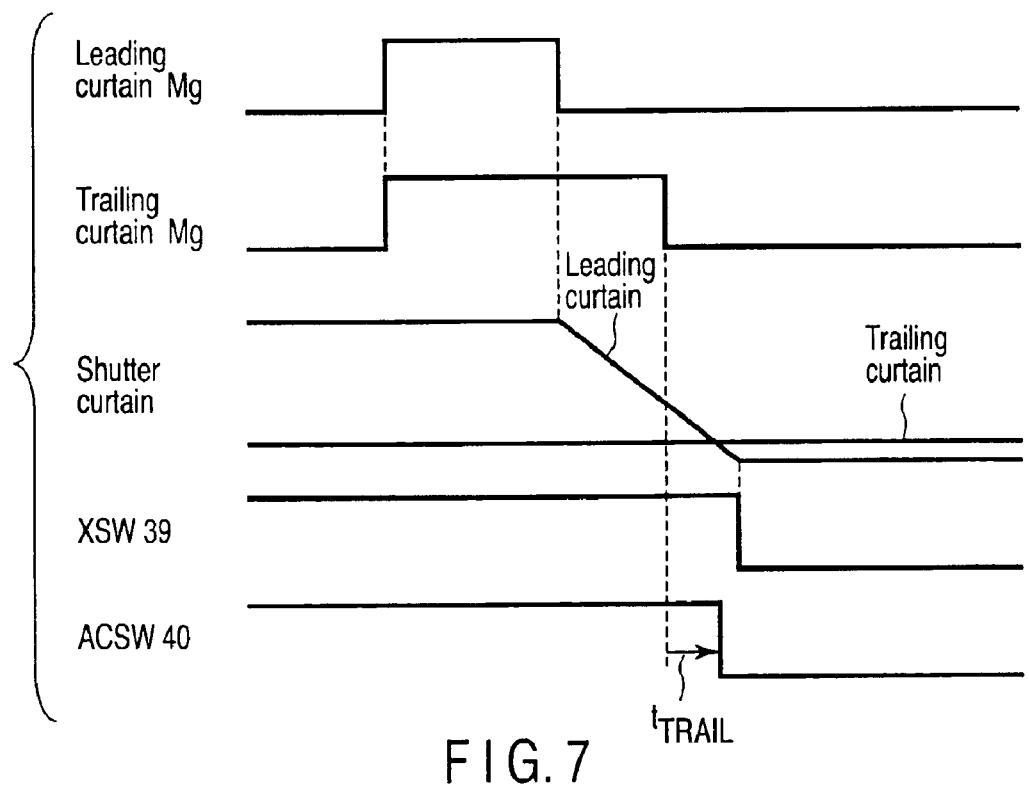
FIG. 7 is a time chart (high speed second time) showing an example in which the shutter abnormally operates and showing an operation in the case in which the leading curtain is charged but the trailing curtain is not charged.

FIG. 7 is a time chart (high speed second time) showing the operation in the case in which the leading curtain is charged but the trailing curtain is not charged.

The above-described time chart of FIG. 6 relates to the low speed second time, and the XSW 39 is turned on before the ACSW 40. However, at the high speed second time, a shutter opening time shortens, and a state could arise in which the ACSW 40 is turned on before the XSW 39.

Even in this case, a value of the time $t_{TRAIL}$ is the same as that of $t_{TRAIL}$ shown in the time chart of FIG. 6. Therefore, even when a timing for turning on the XSW 39 or ACSW 40 shifts forwards/backwards, abnormality detection is possible.

Figure 8:
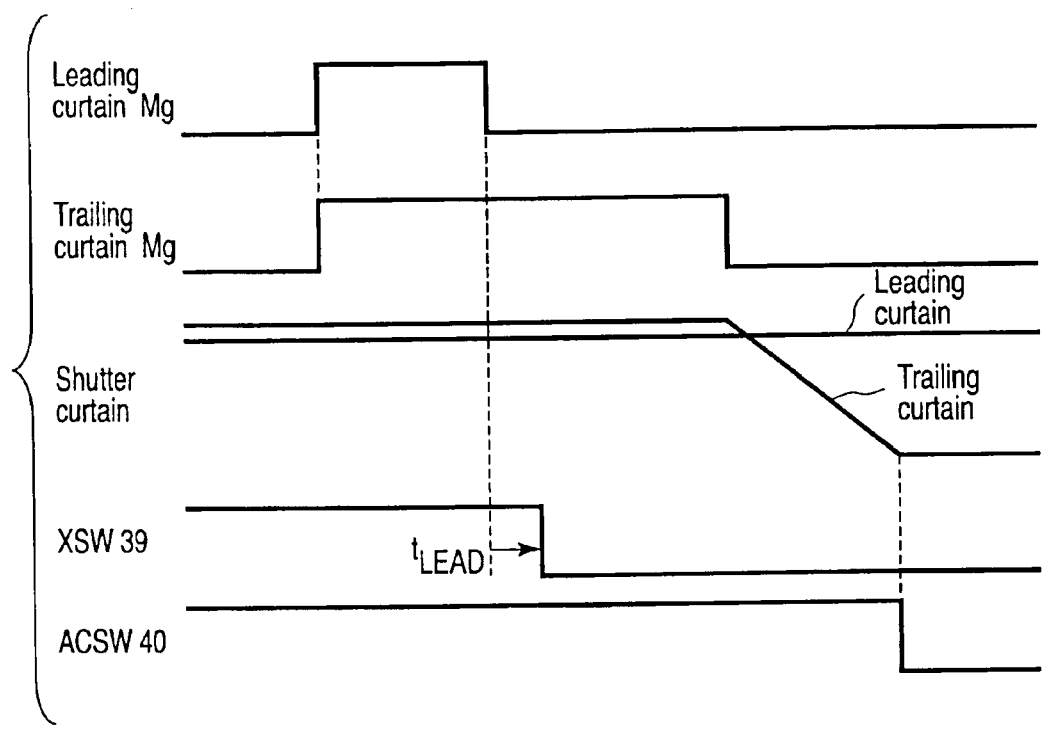
FIG. 8 is a time chart showing the example in which the shutter abnormally operates and showing the operation in the case in which the trailing curtain is charged but the leading curtain is not charged.

FIG. 8 is a time chart showing the operation in the case in which the trailing curtain is charged but the leading curtain is not charged.

In FIG. 8, the trailing curtain interlocks with the off state of the trailing curtain magnet and starts running. When the run is completed, the ACSW 40 is turned on. However, the leading curtain is not charged by the disadvantages described with reference to FIGS. 5A, 5B. Even when the leading curtain magnet is turned off, the curtain does not run at all. As described with reference to FIGS. 5A, 5B, the XSW 39 is turned on even at this abnormal time, and the signal indicating as if the shutter curtain run were completed is outputted.

However, for the attracting member 44, since the shutter curtain 47 is not involved as the load, the load of the spring member 45 is smaller than that at the normal time. Therefore, the urging force becomes relatively strong, and the switch member 46 is turned on earlier than the normal time by the attracting member 44. That is, a time ($t_{LEAD}$ in the drawing) from when the leading curtain magnet is off until the XSW 39 is on indicates a value smaller than that at the normal time. The chattering possibly occurs in the same manner as in the trailing curtain abnormality time.

Figure 9:
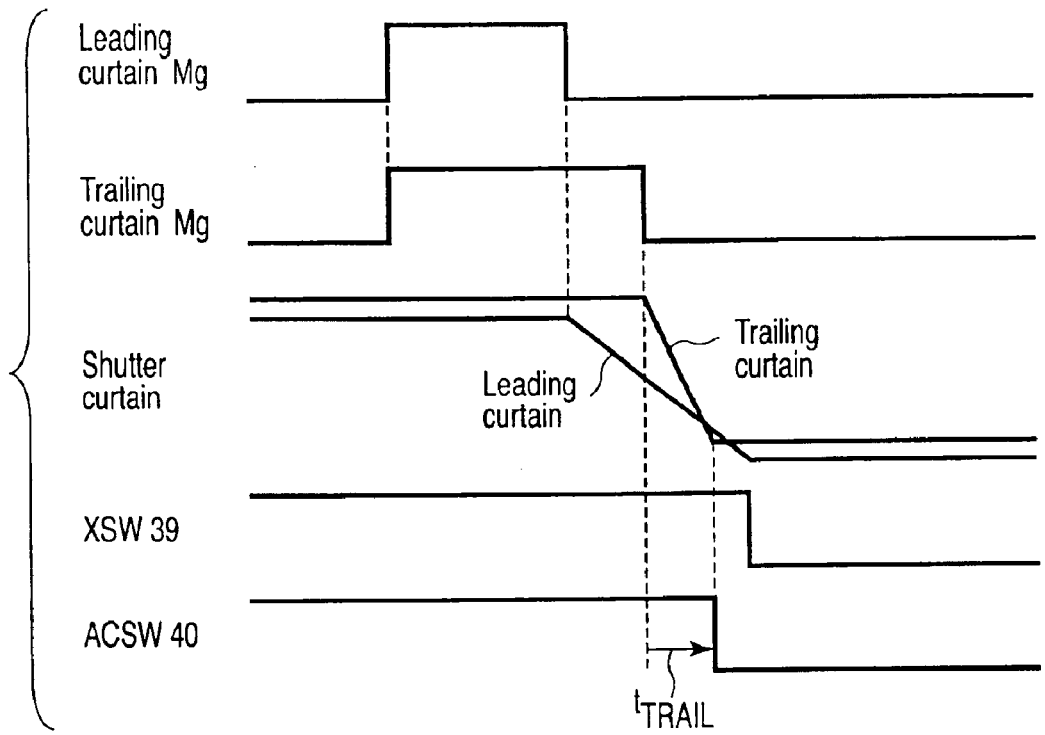
FIG. 9 is a time chart showing the operation in a case in which an abnormality occurs in the speed of the shutter curtain (curtain speed) under a normal shutter charge and the operation in a case in which the speed of the trailing curtain is higher than that at a normal time (a state in which a load on the trailing curtain is small)
Figure 10:
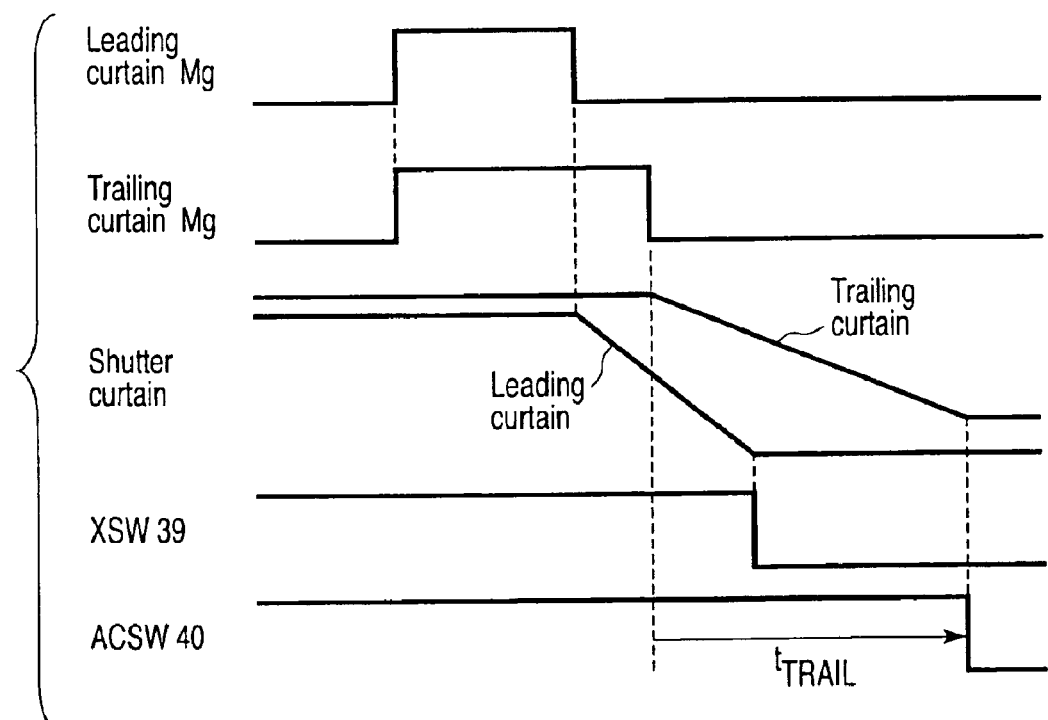
FIG. 10 is a time chart showing the operation in a case in which the abnormality occurs in the speed of the shutter curtain (curtain speed) under the normal shutter charge and the operation in a case in which the speed of the trailing curtain is lower than that at the normal time (a state in which the load on the trailing curtain is large)

FIGS. 9 and 10 are time charts of a case in which the shutter is normally charged but speed (curtain speed) abnormality of the shutter curtain occurs.

With reference to FIGS. 6 to 8, the time charts have been described in which the shutter curtain does not run because of charge defect but the run completion switch turns on in the shutter of such a type that the shutter curtain 47 and attracting member 44 move in separate mechanisms. Here, in the shutter of such a type that the shutter curtain 47 moves integrally with the attracting member 44, even when the curtain is normally charged but there is some trouble in an urging mechanism (not shown) for running the shutter curtain and the curtain does not run at a correct curtain speed, the detection is possible. This time chart of the present invention will be described.

FIG. 9 is a time chart showing the operation in a case in which the speed of the trailing curtain is higher than that at the normal time (a state in which a load on the trailing curtain is lightened).

In this case, since the trailing curtain is driven faster than the normal time, the time $t_{TRAIL}$ is shorter than that at the normal time. In FIG. 9, the trailing curtain gets ahead of the leading curtain, but this differs by second time. In the present invention, since the time $t_{TRAIL}$ is measured, the detection is possible even in this case.

FIG. 10 is a time chart showing the operation in a case in which the speed of the trailing curtain is lower than that at the normal time (a state in which the load on the trailing curtain is increased).

In this case, since the trailing curtain is driven later than the normal time, the time $t_{TRAIL}$ is longer than that at the normal time. In the present invention, since the time $t_{TRAIL}$ is measured, the detection is possible even in this case.

It is to be noted that the above-described time charts of FIGS. 9 and 10 show the trailing curtain, but the detection can similarly be performed even with the leading curtain.

Next, an operation of the whole camera will be described with reference to flowcharts of FIGS. 11 to 13.

FIG. 11 is a flowchart showing the operation of the whole camera which is a main control of the CPU 35.

In a normal end state in which the previous damage does not end, a main switch (not shown) is turned on, and then first in step S1, each component of a camera main body is initialized, and is ready for photography on standby. Next in step S2, it is judged whether or not a first release switch (not shown) has been turned on. Here, the release switch of the camera according to the present invention is constituted of a general two-stages switch. When the first release switch in a half pressed state is turned on, photometry or distance measuring is carried out. When a second release switch in a totally pressed state is turned on, the exposure is realized.

When the first release switch is not turned on in the step S2, the process shifts to step S10. When the first release switch is turned on, the process shifts to step S3.

In the step S3, the photometry is carried out by a photometry sensor (not shown), and a diaphragm value shutter speed value is calculated. Next in step S4, focus adjustment is carried out in step S4. Subsequently, as a result of the step S4, it is judged in step S5 whether or not the photography lens is in a focused state. Here, when the state is not the focused state, the process shifts to step S9. In the focused state, the process shifts to step S6.

It is judged in the step S6 whether or not the second release switch is turned on. Here, when the switch is not turned on, the process shifts to step S9. On the other hand, when the second release switch is turned on, the process shifts to step S7 to carry out a shutter control and exposure (exposure operation) of a film. This film exposure will be described later in detail.

After the film is exposed, one frame of film is wound up in step S8. Subsequently, in step S9, display of the number of frames in a display portion (LCD) (not shown) is changed. Thereafter, the process shifts to the step S2.

Moreover, when the first release switch is off in the step S9, the process shifts to step S10, and it is judged whether or not states of other switches (not shown) (photography mode switch, strobe switch, zoom switch, and the like) are changed. Here, when the states of the other switches are unchanged, the process shifts to step S9. On the other hand, when the states are changed, the process shifts to step S11, and processing for the changed switch is carried out. Thereafter, the process shifts to the step S9. The operation at the normal time has been described above.

On the other hand, when the damage is generated last time and the operation ends in the locked state, again the operation of the camera is resumed by the operation of the main switch (not shown) or the detaching/inserting of the battery. The operation in this case (steps S12 to S14) will be described.

To return from the damage, the process is resumed from step S12. In the step S12, it is judged whether or not a permanent lock state is achieved. This "permanent lock state" indicates that when critical troubles such as non-exposure are generated, the locked state is permanently continued so that the photography is impossible as long as the camera is not brought into repair. When the camera is brought into this state, a predetermined damage flag is written in the nonvolatile memory 34 at a damage generation time.

It is to be noted that in an embodiment described later, an example in which the camera is not brought into the permanent lock state has been described. To bring the camera into the permanent lock state, concretely, at the same time a shutter damage flag is set, a predetermined permanent lock flag is also set, and may be written in the nonvolatile memory 34.

When the camera is not in the permanent lock state in the step S12, the process shifts to step S13, and each component is initialized in the same manner as in the step S1. Next, in step S14, the component ended in the damaged state is rechecked. For example, when the operation ends in a shutter damaged state, a shutter damage is checked. Thereafter, the process shifts to the step S2.

On the other hand, when the permanent lock state is judged in the step S12, a damage lock process is carried out.

Figure 12:
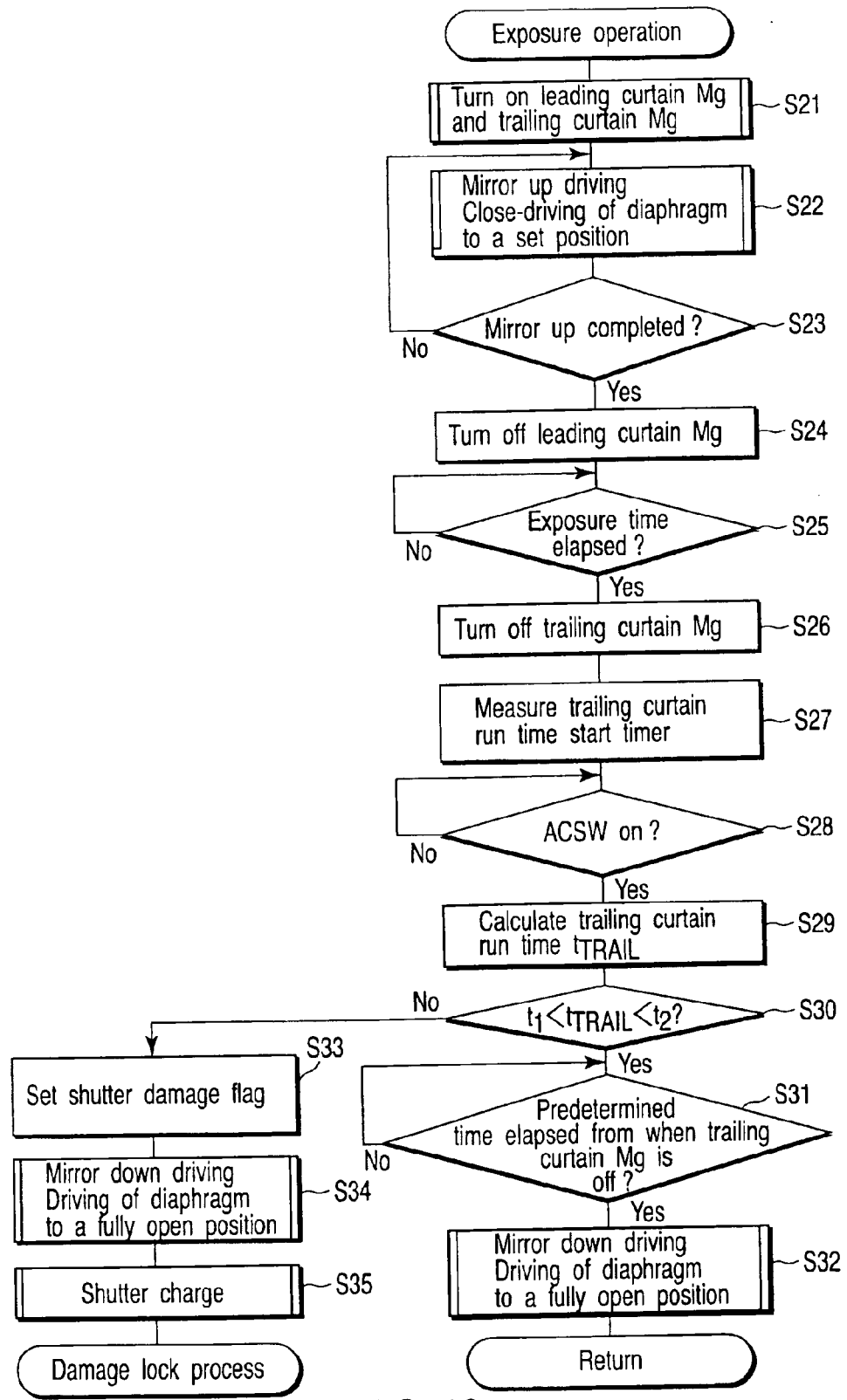
FIG. 12 is a flowchart showing an operation of a sub-routine "exposure operation" of step S7 in the flowchart of FIG. 11.

FIG. 12 is a flowchart showing an operation of a subroutine "exposure operation" of the step S7 in the flowchart of FIG. 11. The flowchart of FIG. 11 corresponds to the time charts of FIGS. 6, 7, 9, and 10, and the run time of the trailing curtain is measured.

First in step S21, the leading and trailing curtain magnets are turned on, and the leading and trailing curtains are engaged. That is, a shutter charge completed, run preparation completed state is achieved. Subsequently, in step S22, upward driving of the movable mirror 14 and close-driving of the diaphragm mechanism 12 to a set position are carried out. Subsequently, the steps S22 and S23 are repeated until a mirror up completion signal ("L" of the MUSW 37) is observed in step S23.

It is to be noted that here, to cancel the chattering of the MUSW 37, logic of the MUSW 37 is read a plurality of times at a predetermined time (about 100 μs) interval. When the logic is the same a plurality of times, this logic is decided. This method may be used (not shown in the drawing).

Next in step S24, the leading curtain magnet is turned off to start running the leading curtain. Subsequently, in step S25, the process is on standby for a time (exposure time) corresponding to a shutter speed calculated in the step S3 in the flowchart of FIG. 11.

When this exposure time elapses, the process shifts to step S26, and the trailing curtain magnet is turned off to start running the trailing curtain. Additionally, in order to measure the run time of the trailing curtain, a timer is started in step S27.

In step S28, the process is on standby until the ACSW 40 is turned on ("L"). Here, to cancel the chattering of the ACSW 40, the logic of the ACSW 40 is read a plurality of times at the predetermined time (about 100 μs) interval. When the logic is the same a plurality of times, this logic is decided. This method may be used (not shown in the drawing).

When the ACSW 40 is on in the step S28, the process shifts to step S29, and the trailing curtain run time $t_{TRAIL}$ is read from a trailing curtain run time measurement timer. Subsequently, it is judged in step S30 whether or not the trailing curtain run time $t_{TRAIL}$ is in a predetermined range ($t_1<t_{TRAIL}<t_2$) This predetermined range is a time range of a value determined by the designing or manufacturing of the shutter, and any normal product falls within this range.

When the trailing curtain run time $t_{TRAIL}$ falls in the predetermined range, the state is normal, and the process shifts to step S31. Moreover, in this step S31, as described with reference to the time chart of FIG. 3, the process is on standby from when the trailing curtain magnet is off until the predetermined time elapses. For this predetermined time, the trailing curtain run time timer may be used, or a separate timer may also be used, and the time is sufficient for the trailing curtain to end the run.

When the predetermined time elapses, the process shifts to step S32 to carry out down driving of the movable mirror 14 and driving of the diaphragm mechanism 12 to a fully open position. Thereafter, the process shifts to the step S8 of the flowchart of FIG. 11 through this routine.

On the other hand, in the step S30, when the trailing curtain run time $t_{TRAIL}$ is not in the predetermined range, there is a possibility that the non-exposure arises. Therefore, the process shifts to step S33 to set a shutter damage flag. This flag is written in the nonvolatile memory 34. Although not shown, to achieve the permanent lock state described in the step S12 of the flowchart of FIG. 11, here a predetermined permanent lock flag may be set and written into the nonvolatile memory 34.

Subsequently, in step S34, the down driving of the movable mirror 14 and driving of the diaphragm mechanism 12 to a fully open position are carried out. Subsequently, after the shutter is charged in step S35, a damage lock process is carried out. This damage lock process is a process in which the operation of the camera is locked and the subsequent operation is prohibited. To escape from this lock state, the process is restarted by the operation of the main switch (not shown) and the inserting/detaching of the battery, and a process operation is restarted from the step S12 of the flowchart of FIG. 11.

Figure 13:
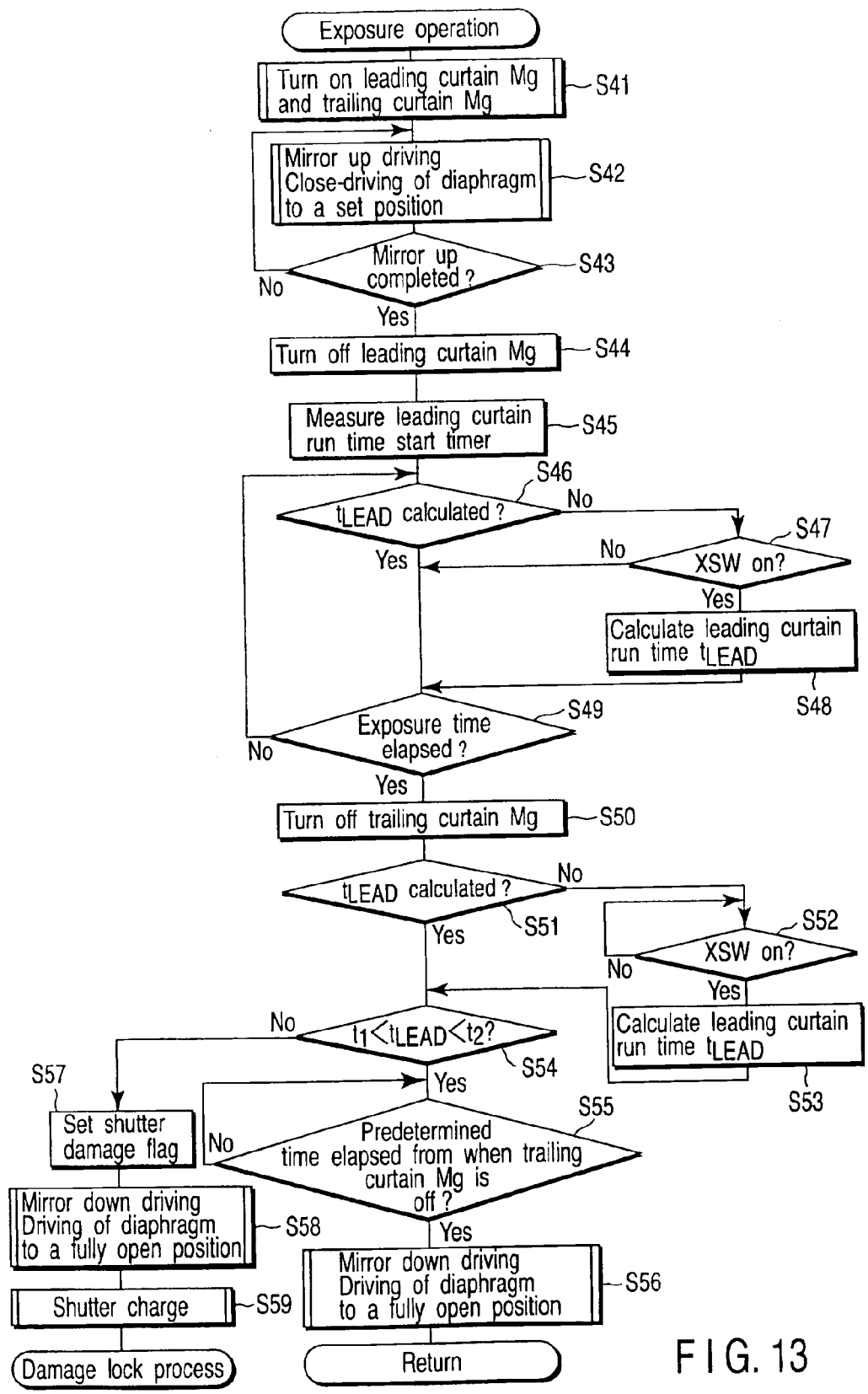
FIG. 13 is a flowchart showing an operation in a second example of the sub-routine "exposure operation" of the step S7 in the flowchart of FIG. 11.

FIG. 13 is a flowchart showing an operation in a second example of the sub-routine "exposure operation" of the step S7 in the flowchart of FIG. 11. This flowchart of FIG. 11 corresponds to the time chart of FIG. 8, and the run time of the leading curtain is measured.

Since the process operation of steps S41 to S44 is the same as that of the steps S21 to S24 in the flowchart of FIG. 12, the description is omitted. Next, at the same time the leading curtain magnet is turned off in the step S44, in step S45 a timer for measuring the run time of the leading curtain is started.

Subsequently, it is judged in step S46 whether or not the leading curtain run time $t_{LEAD}$ has been calculated. Here, when the time is calculated, the process shifts to step S49. When the time is not calculated, the process shifts to step S47, and is on standby until the XSW 39 is turned on ("L"). Here, to cancel the chattering of the XSW 39, the logic of the XSW 39 is read a plurality of times at the predetermined time (about 100 μs) interval. When the logic is the same a plurality of times, this logic is decided. This method may be used (not shown in the drawing).

When the XSW 39 is off in the step S47, the process shifts to step S49. On the other hand, when the XSW 39 is on, the process shifts to step S48, and the leading curtain run time $t_{LEAD}$ is read from a leading curtain run time measurement timer.

In step S49, the process is on standby only for a time (exposure time) corresponding to the shutter speed calculated in the step S3 of the flowchart of FIG. 11. Here, the steps S46 to S49 are repeated until the exposure time elapses. When the exposure time elapses, the process shifts to step S50, and the trailing curtain magnet is turned off to start the run of the trailing curtain.

Next, it is judged again in step S51 whether or not the leading curtain run time $t_{LEAD}$ has been calculated. Some exposure time is not calculated in the step S48. In this case, the process shifts to step S52.

In the step S52, the process is on standby until the XSW 39 is turned on ("L"). Here, the process is on standby until the XSW 39 is on. Subsequently, when the XSW 39 is on, the process shifts to step S53 to calculate the leading curtain run time $t_{LEAD}$ from the leading curtain run time measurement timer.

It is judged in step S54 whether or not the leading curtain run time $t_{LEAD}$ is in a predetermined range ($t_1<t_{LEAD}<t_2$). This predetermined range is a time range of the value determined by the designing or manufacturing of the shutter, and any normal product falls within this range. Basically, the predetermined ranges of the leading and trailing curtains are the same.

When the leading curtain run time $t_{LEAD}$ falls in the predetermined range, the process shifts to step S55. When the time is not in the predetermined range, the process shifts to step S57.

Since the process operations of steps S55 and S56, S57 to S59 are the same as those of the steps S31 and S32, S33 to S35 in the flowchart of FIG. 12, the description is omitted.

Figure 14:
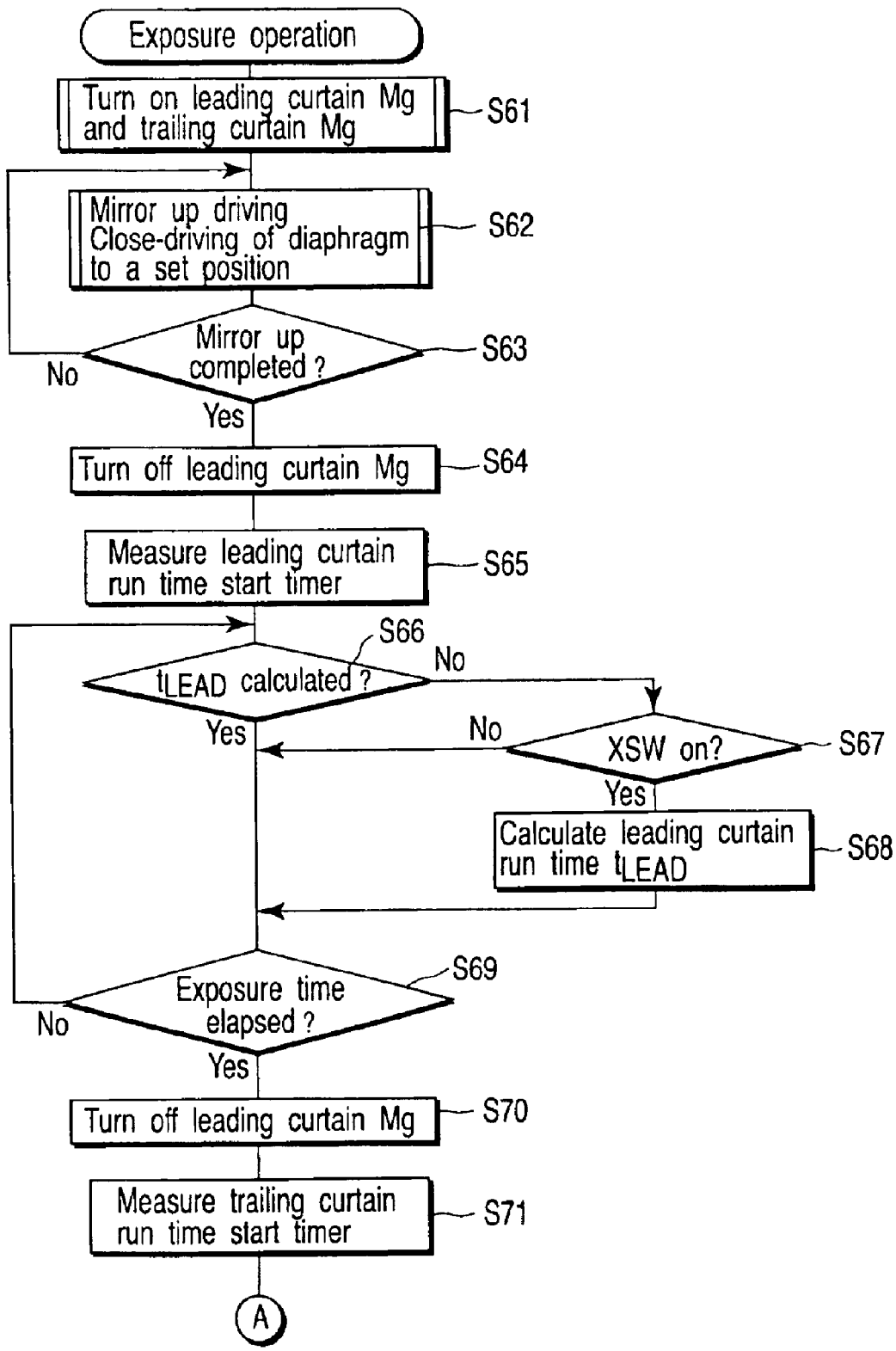
FIG. 14 is a flowchart showing an operation in a third example of the sub-routine "exposure operation" of the step S7 in the flowchart of FIG. 11.
Figure 15:
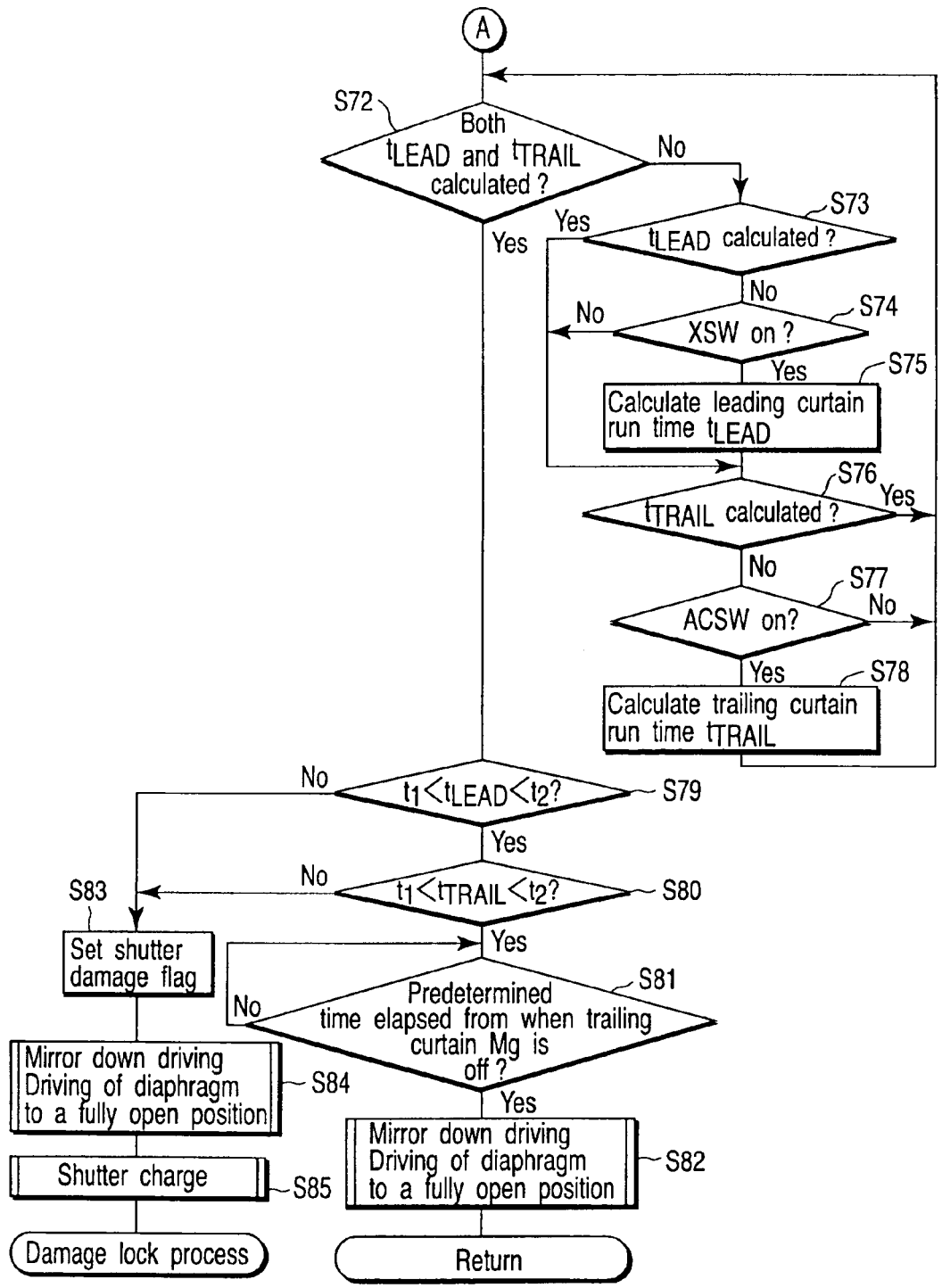
FIG. 15 is a flowchart showing an operation in the third example of the sub-routine "exposure operation" of the step S7 in the flowchart of FIG. 11.

FIGS. 14 and 15 are flowcharts showing the operation in a third example of the sub-routine "exposure operation" of the step S7 in the flowchart of FIG. 11. For this third operation example, the above-described first and second examples are combined to form an example in which both the leading and trailing curtain run times are measured.

Since the process operation of steps S61 to S70 is the same as that of the steps S41 to S50 in the flowchart of FIG. 13, the description is omitted.

In step S71, a timer is started to measure the run time of the trailing curtain. Subsequently, it is judged in step S72 whether or not the leading curtain run time $t_{LEAD}$ has been calculated in the step S68 or in step S75 described later and whether or not the trailing curtain run time $t_{TRAIL}$ has been calculated. When the run times are not calculated in this step S72, the process shifts to step S73. When the run times are calculated, the process shifts to step S79.

It is judged in step S73 whether or not the leading curtain run time $t_{LEAD}$ has been calculated. Here, when the time has not been calculated, the process shifts to step S74 and is on standby until the XSW 39 is turned on ("L"). Here, to cancel the chattering of the XSW 39, the logic of the XSW 39 is read a plurality of times at the predetermined time (about 100 μs) interval. When the logic is the same a plurality of times, this logic is decided. This method may be used (not shown in the drawing).

When the leading curtain run time $t_{LEAD}$ has been calculated in the step S73, and when the XSW 39 is off in the step S74, the process shifts to step S76. On the other hand, when the XSW 39 is on in the step S74, the process shifts to step S75, and the leading curtain run time $t_{LEAD}$ is read from the leading curtain run time measurement timer.

It is judged in the step S76 whether or not the trailing curtain run time $t_{TRAIL}$ has been calculated in step S78 described later. Here, when the time has been calculated, the process shifts to the step S72. When the time has not been calculated, the process shifts to step S77.

In the step S77, the process is on standby until the ACSW 40 is turned on ("L"). Here, the steps S72 to S77 are repeated on standby until the ACSW 40 turns on. Moreover, when the ACSW 40 turns on, the process shifts to step S78 to calculate the trailing curtain run time $t_{TRAIL}$ from the trailing curtain run time measurement timer. Thereafter, the process shifts to the step S72.

It is judged in step S79 whether or not the leading curtain run time $t_{LEAD}$ is in a predetermined range ($t_1 < t_{LEAD} < t_2$). This predetermined range is a time range of the value determined by the designing or manufacturing of the shutter, and any normal product falls within this range. Basically, the predetermined ranges of the leading and trailing curtains are the same. When the leading curtain run time $t_{LEAD}$ is in the predetermined range, it is judged in the subsequent step S80 whether or not the trailing curtain run time $t_{TRAIL}$ is in a predetermined range ($t_1 < t_{TRAIL} < t_2$) When the leading curtain run time $t_{LEAD}$ and trailing curtain run time $t_{TRAIL}$ are both in the predetermined range in the steps S79 and S80 ($t_1 < t_{TRAIL}$, $t_{LEAD} < t_2$), the process shifts to step S81. When either time is not in the predetermined range, the process shifts to step S83.

Since the process operations of the steps S81 and S82, S83 to S85 are the same as those of the steps S55 and S56, S57 to S59 in the flowchart of FIG. 13, the description is omitted.

Figure 16:
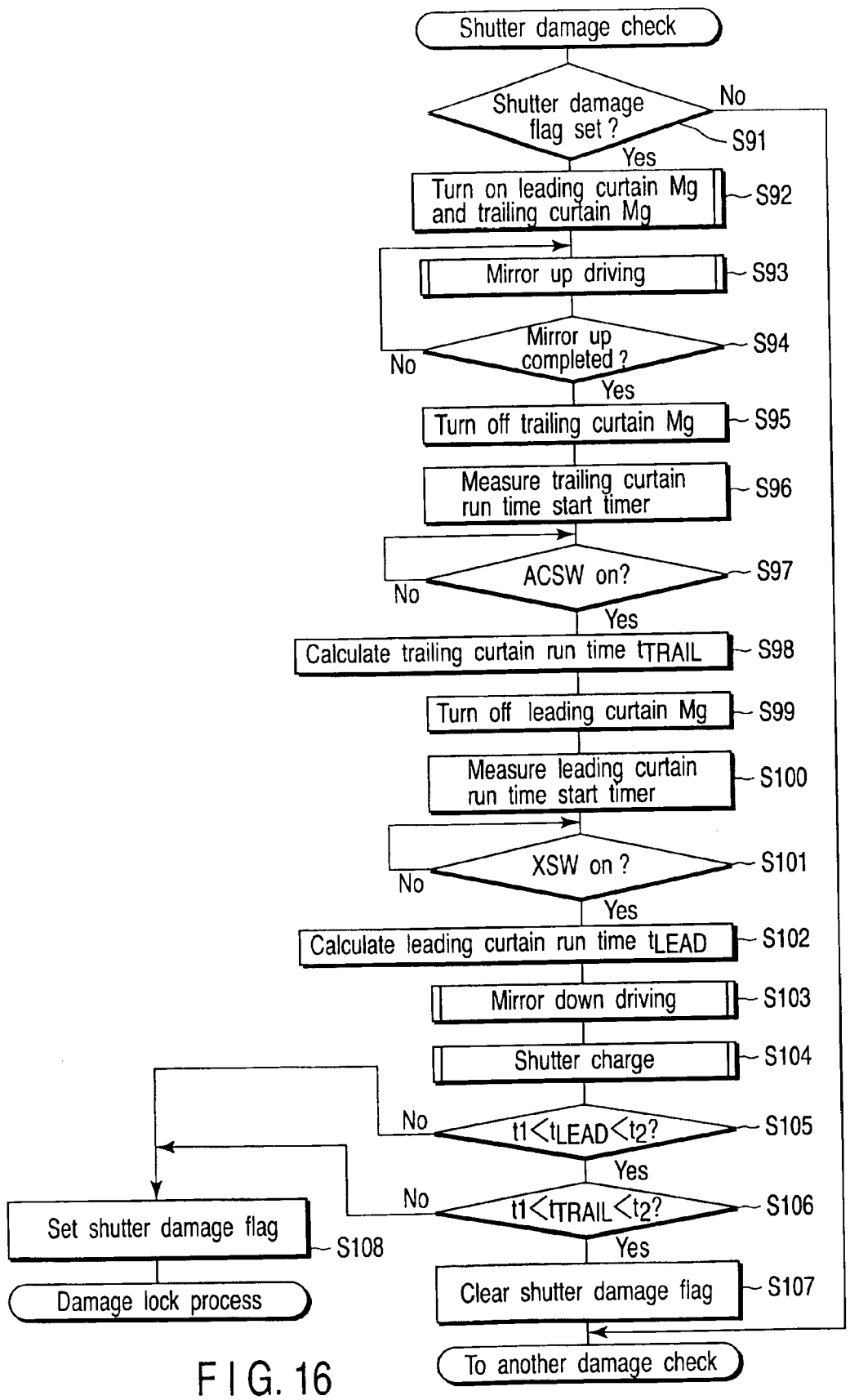
FIG. 16 is a flowchart showing an operation of a sub-routine "shutter damage check" of step S14 in the flowchart of FIG. 11.

FIG. 16 is a flowchart showing an operation of a subroutine "shutter damage check" of the step S14 in the flowchart of FIG. 11 in the above-described embodiment.

In the step S33 in the flowchart of FIG. 12, the step S57 in the flowchart of FIG. 13, and the step S83 in the flowchart of FIG. 15, a shutter damage flag is set. While the flag is stored in the nonvolatile memory 34, a damaged portion is rechecked in the step S14 in the flowchart of the 11.

In the flowchart of FIG. 16, when the shutter is rechecked and the damage (non-exposure) is again detected, the damage lock process is carried out again. When the shutter returns to be normal, the damage check is carried out to permit the subsequent operation. Accordingly, even when the non-exposure is detected by temporary dust, and the like, but when the state returns to be normal, the operation is permitted.

First, it is judged in step S91 whether or not the shutter damage flag has been set. That is, in the step S33 in the flowchart of FIG. 12, the step S57 in the flowchart of FIG. 13, and the step S83 in the flowchart of FIG. 15, the shutter damage flag is set, and stored in the nonvolatile memory 34. Only in this case, the recheck in and after step S92 is carried out. On the other hand, when the shutter damage flag is not set, the process escapes from this routine to carry out another damage check.

Since the process operations of steps S92 to S94, S95 to S98, and S99 and S100 are the same as those of the steps S21 to S23, S26 to S29 in the flowchart of FIG. 12, and S44 and S45 in the flowchart of FIG. 13, the description is omitted.

Subsequently, in step S101, the process is on standby until the XSW 39 turns on. Here, when the XSW 39 turns on, the process shifts to step S102 to read the leading curtain run time $t_{LEAD}$ from the leading curtain run time measurement timer. Here, a reason why the trailing curtain is started to run rather than the leading curtain at the check time is that the film is prevented from being uselessly exposed.

Next, in step S103 the movable mirror 14 is down-driven. Subsequently, the shutter is charged in step S104.

Furthermore, it is judged in steps S105 and S106 whether or not the leading curtain run time $t_{LEAD}$ and trailing curtain run time $t_{TRAIL}$ are in predetermined ranges ($t_1 < t_{TRAIL}$, $t_{LEAD} < t_2$). When the leading curtain run time $t_{LEAD}$ and trailing curtain run time $t_{TRAIL}$ are both in the predetermined ranges ($t_1 < t_{TRAIL}$, $t_{LEAD} < t_2$) in the steps S105 and S106, the process shifts to step S107. When either time is not in the predetermined range, the process shifts to step S108.

In the step S107, since the normal state is returned, the shutter damage flag is cleared and written in the nonvolatile memory 34. Thereafter, the process escapes from this routine and shifts to the step S2 in the flowchart of FIG. 11 to carry out the normal operation.

On the other hand, in the step S108, since the normal state is not returned, the shutter damage flag remains in the set state. Subsequently, the damage lock process is again carried out.

In the above embodiment, the example in which the run time of the curtain is directly measured has been described, but the following modification example is possible in which the time is indirectly measured.

Figure 17:
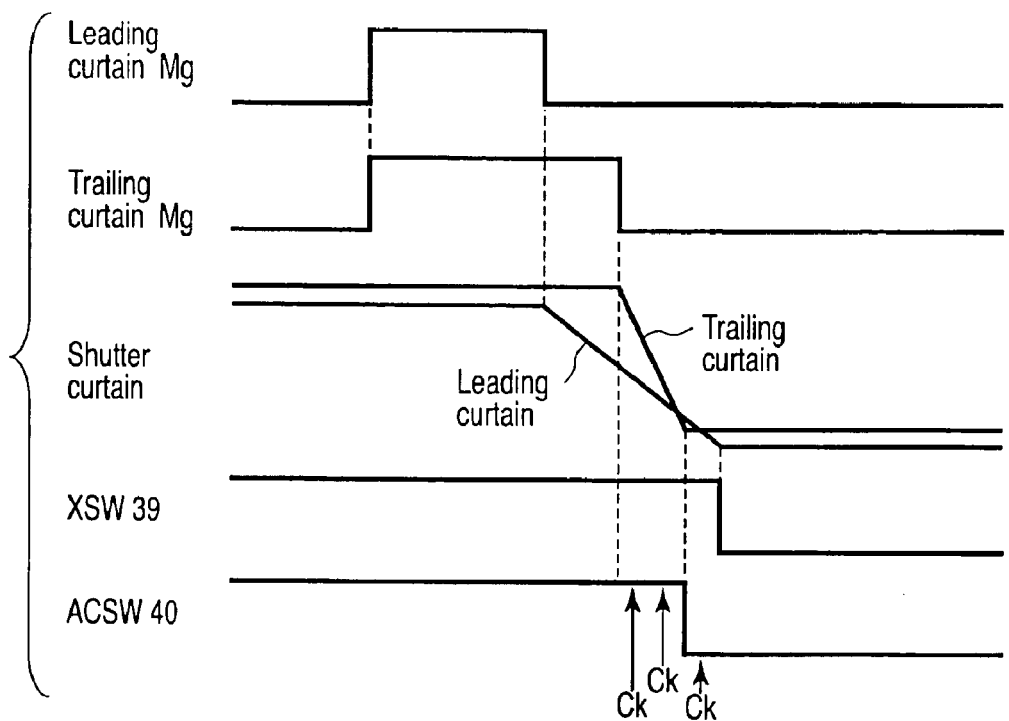
FIG. 17 is a time chart showing a modification example of an operation to measure a trailing curtain run time.

FIG. 17 is a time chart showing the modification example of an operation to measure the trailing curtain run time.

In the time chart of FIG. 17, the logic of the ACSW 40 is checked at a predetermined timing during the running of the trailing curtain (point $C_k$ in FIG. 17). When the logic of the ACSW 40 changes in a timing other than the normal timing of the trailing curtain run time, the non-exposure is judged.

The logic of the ACSW 40 is periodically judged, and it is judged whether or not the logic of the ACSW 40 changes in the normal timing of the run time. Therefore, in other words, the trailing curtain run time is measured.

Figure 18:
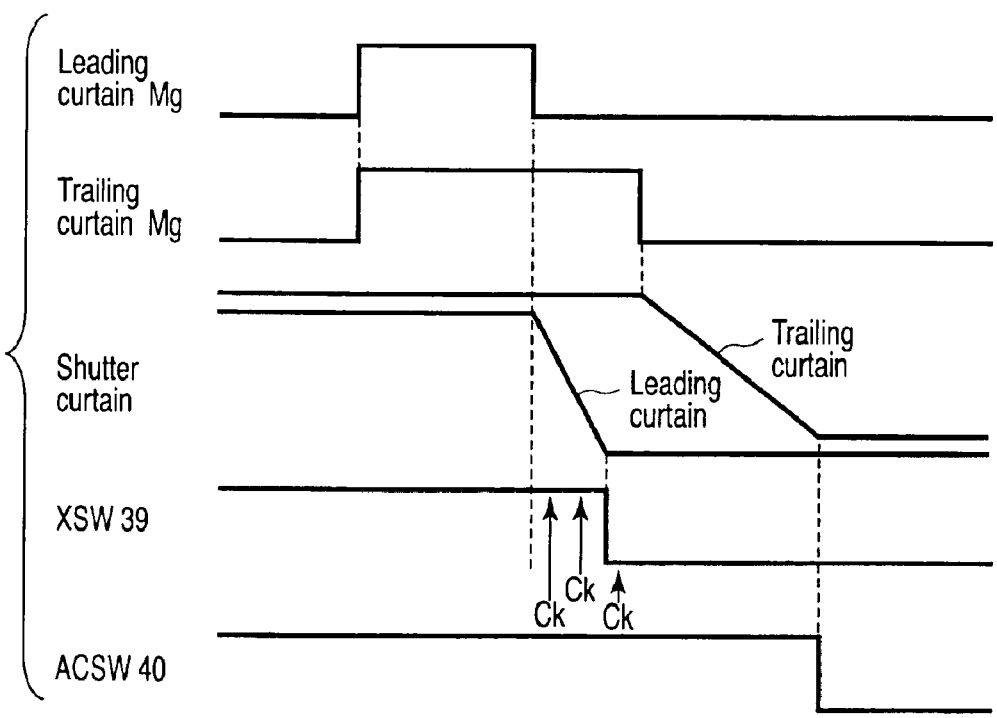
FIG. 18 is a time chart showing the modification example of the operation to measure a leading curtain run time.

FIG. 18 is a time chart showing the modification example of the operation to measure the leading curtain run time.

In the time chart of FIG. 18, the logic of the XSW 39 is checked at the predetermined timing during the running of the leading curtain (point CK in FIG. 18). When the logic of the XSW 39 changes in the timing other than the normal timing of the leading curtain run time, the non-exposure is judged.

The logic of the XSW 39 is periodically judged, and it is judged whether or not the logic of the XSW 39 changes in the normal timing of the run time. Therefore, in other words, the leading curtain run time is measured.

Figure 19:
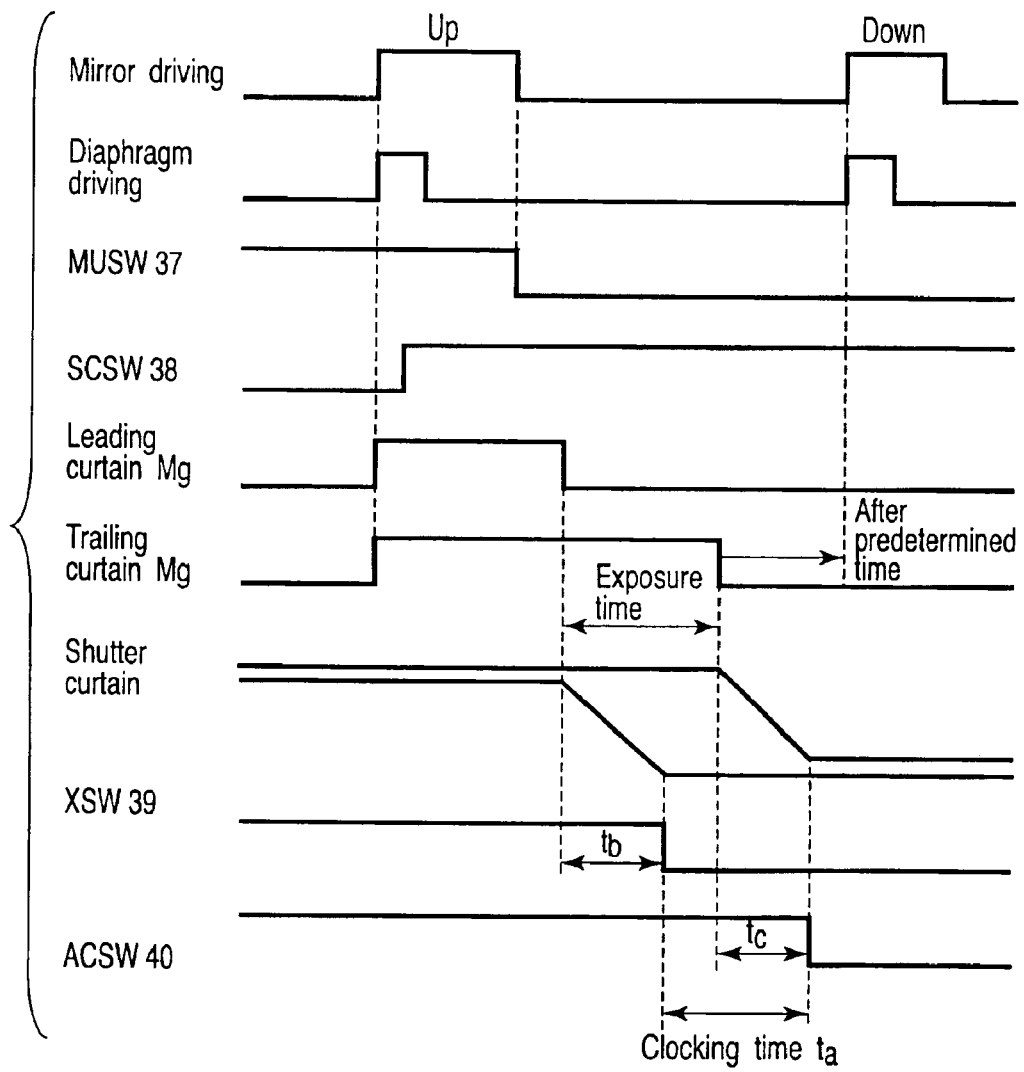
FIG. 19 is a time chart showing the operation in a fourth example of the sub-routine "exposure operation" of the step S7 in the flowchart of FIG. 11 according to the present invention.

FIG. 19 is a time chart showing the operation in a fourth example of the sub-routine "exposure operation" of the step S7 in the flowchart of FIG. 11 according to the present invention. The time chart of FIG. 19 is basically the same as that of FIG. 3. Therefore, only a different respect will be described.

In the time chart of FIG. 3, after the run of the trailing curtain starts, the time is measured until the trailing curtain run completion SW (ACSW 40) turns on, and the abnormality or normality of the shutter curtain is judged. On the other hand, in the time chart of FIG. 19, a time ($t_a$) from when the leading curtain run completion SW (XSW 39) turns on until the trailing curtain run completion SW (ACSW 40) turns on is measured to judge the abnormality or normality of the shutter curtain.

When the curtain run speeds of the leading and trailing curtains are the same, a difference between a time ($t_b$) from when the leading curtain starts running until the run completion SW (XSW 39) of the leading curtain turns on and a time ($t_c$) from when the trailing curtain starts running until the run completion SW (ACSW 40) of the trailing curtain turns on is substantially constant. Since a positional relation between the XSW 39 and ACSW 40 is not necessarily the same, the time ($t_a$) from the run start of each of the leading and trailing curtains until each SW turns on is not necessarily the same.

Additionally, it is considered that little difference is generated in mechanical friction because of temperature, humidity, posture difference, the number of operations, and the like.

A difference of the on timing of the run completion SW with respect to the exposure time at the normal operation time is obtained beforehand at a plant shipment time, and is stored as the correction value beforehand in nonvolatile memories such as EEPROM. An earlier time deviation of the time from when each shutter curtain starts running until the XSW 39 or ACSW 40 turns on differs with the mechanism of the shutter unit. Therefore, the correction value can take either plus or minus value.

Furthermore, different from the above correction, since fluctuation is generated in the run time of the shutter every time, the time ($t_a$) from when the XSW 39 turns on until the ACSW 40 turns on needs to be judged in a certain fluctuation range. When this value is too large, there is no meaning. When this is too small, even a normal result is frequently caught. The value also depends on the type of shutter unit, but in a shutter for high speeds, in which a total open second time (X second time) is faster than 1/125 second, the curtain run time is 4 msec to 5 msec. In a shutter for intermediate speeds, in which the total open second time (X second time) is about 1/125 second to 1/100 second, the run time is 6 msec to 8 msec. In a shutter for low speeds, in which a total open second time (X second time) is about 1/60 second, the run time is 8 msec to 10 msec.

For the shutter for high speeds, the fluctuation range is ±1 msec. For the shutter for intermediate speeds, the range is ±2 msec. For the shutter for low speeds, the range is about ±3 msec. The range may thus be determined in accordance with capabilities of the shutter unit.

A calculation example of the shutter unit of 1/100 second at the total open second time will be described hereinafter.

Exposure time+correction value−2 msec $\leq t_a \leq$ exposure time+correction value+2 msec, where the exposure time is a shutter second time obtained by photometry calculation, and by the correction value, the deviation of the timing in which the XSW 39 or ACSW 40 is turned on is corrected at the plant shipment time. When the above equation is established, the shutter is judged to be normal. When $t_a$ exceeds this range, the shutter is judged to be abnormal.

Figure 20:
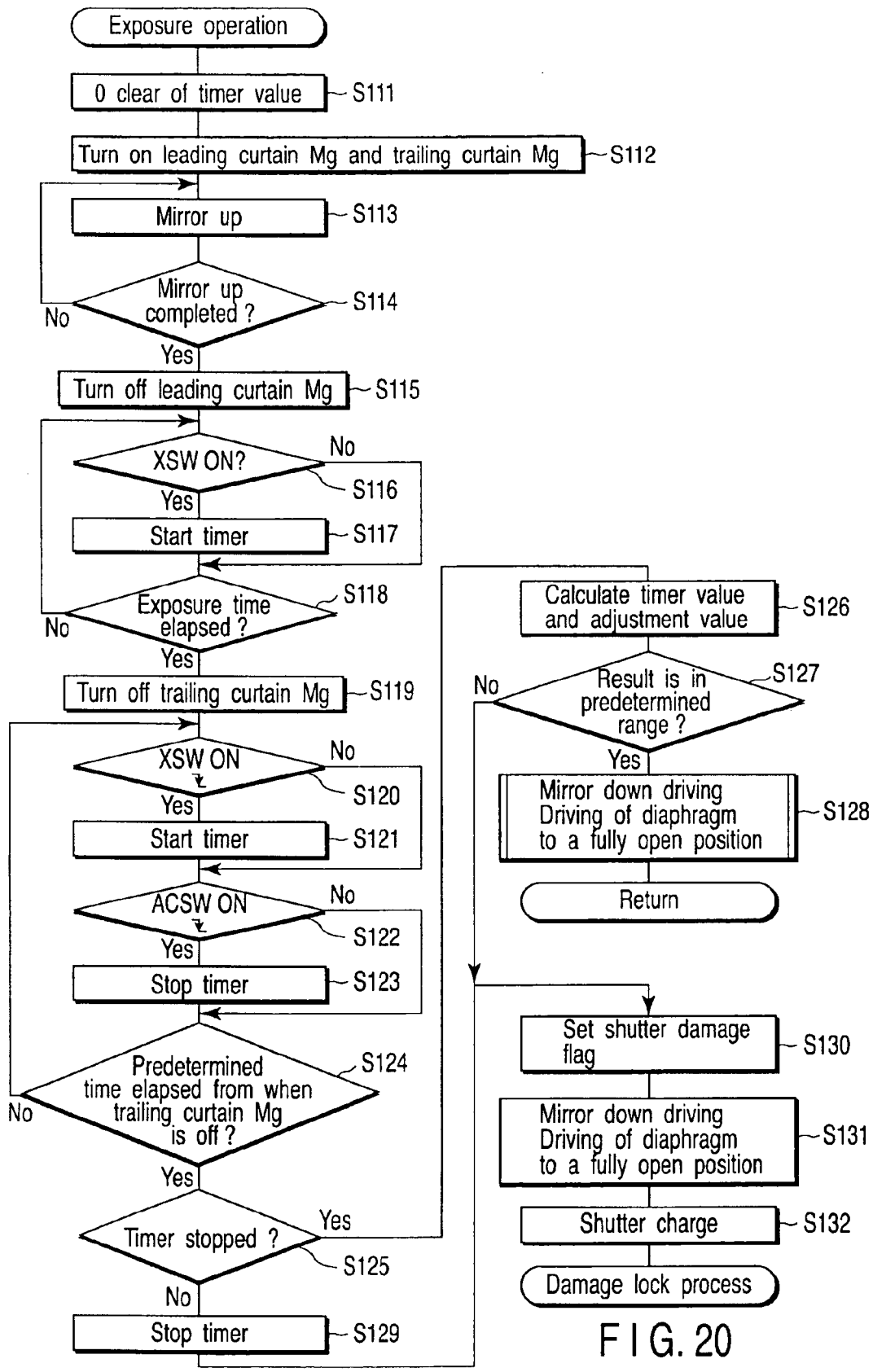
FIG. 20 is a flowchart showing the operation in the fourth example of the sub-routine "exposure operation" of the step S7 in the flowchart of FIG. 11.

FIG. 20 is a flowchart showing the operation in the fourth example of the sub-routine "exposure operation" of the step S7 in the flowchart of FIG. 11.

First in step S111, a timer for clocking $t_a$ is initialized. At this time, a timer counter remains to be reset, and the operation of the counter is still stopped.

Next, in step S112 the magnet for holding the leading or trailing curtain is turned on to bring the shutter curtain into an adsorbed state. Subsequently, in step S113, at the same time the movable mirror 14 is moved up, a diaphragm blade is narrowed down. The movable mirror 14 completes moving up by the detection of the MUSW 37 in step S114.

When the mirror-up is completed in the step S114, the process shifts to step S115, and the magnet adsorbed by the leading curtain is turned off to run the leading curtain. Subsequently, in step S116, the XSW 39 turns on from the off state and a signal falling is detected. Here, when the XSW 39 is on, the process shifts to step S117 to start the counting of the timer. On the other hand, when the XSW 39 is not on, or when the timer has already started counting, the process shifts to step S118.

Subsequently, the completion of the clocking of the exposure time is detected in the step S118. Here, when the exposure has not been completed, the process shifts to the step S116, and the process of the steps S116 to S118 is repeated. On the other hand, when the exposure is completed, the process shifts to step S119.

Since the clocking of the exposure time is completed in the step S119, the run of the trailing curtain is started. That is, the magnet adsorbed by the trailing curtain is turned off to start the running of the trailing curtain.

Furthermore, in step S120, the signal fall is detected indicating that the XSW 39 turns on from the off state. This is because after the trailing curtain run start, the XSW 39 sometimes turns on at the high speed second time. The falling signal indicating that the XSW 39 turns on from the off state is detected, and the process shifts to step S121 to start the count of the timer. On the other hand, when the XSW 39 is not on, or when the timer has already started counting, the process shifts to step S122.

In this step S122, the signal falling to on from off of the ACSW 40 is detected. Here, when the falling of the signal to on from off of the ACSW 40 is detected, the process shifts to step S123 to stop the count of the timer. On the other hand, when the ACSW 40 is not on, or when the timer has already stopped counting, the process shifts to step S124.

Subsequently, it is judged in step S124 whether or not a predetermined time including a sufficient allowance in the trailing curtain running has elapsed from the trailing curtain run start. Here, when the predetermined time has elapsed, the exposure is judged to end, and the process shifts to step S125. On the other hand, when the clocking time does not end, the process shifts to the step S120, and the process of the steps S120 to S124 is repeated.

Subsequently, it is judged in step S125 whether or not the count operation of the timer is stopped. Here, when the timer is not stopped, the ACSW 40 is not detected and the shutter is therefore judged to be abnormal. Therefore, in this case, the process shifts to step S129. After the timer stops, the process shifts to step S130. On the other hand, when the timer is stopped, the process shifts to step S126.

In the step S126, time data is converted/calculated from a timer value, and time $t_a$ is obtained. Furthermore, based on the above conversion/calculation equation, range information required for judgment of step S127 described later is obtained.

Subsequently, it is judged in step S127 whether or not the above-described $t_a$ is in the range. Here, when $t_a$ is in the above-described range, the process shifts to step S128. Outside the range, the process shifts to step S130.

In the step S128, the down driving of the movable mirror 14 and driving of the diaphragm mechanism 12 to a fully open position are carried out. Thereafter, the process escapes from this routine, and shifts to the step S8 of the flowchart of FIG. 11.

Moreover, in the step S130, the shutter damage flag is set. This flag is written in the nonvolatile memory 34. Next, in step S131, the down driving of the movable mirror 14 and driving of the diaphragm mechanism 12 to a fully open position are carried out. Furthermore, after the shutter is charged in step S132, the damage lock process is carried out. To escape from this lock state, the process is restarted by the operation of the main switch or the inserting/detaching of the battery (not shown). Therefore, the process operation is restarted from the step S12 of the flowchart of FIG. 11.

Second Embodiment

A second embodiment of the present invention will be described hereinafter. Since the constitution of the camera (FIG. 2), the operation in the case in which the shutter normally operates (FIG. 3), and the operation of the whole camera (FIG. 11) described in the first embodiment can be applied as such to the second embodiment, detailed description is omitted here.

Figure 21:
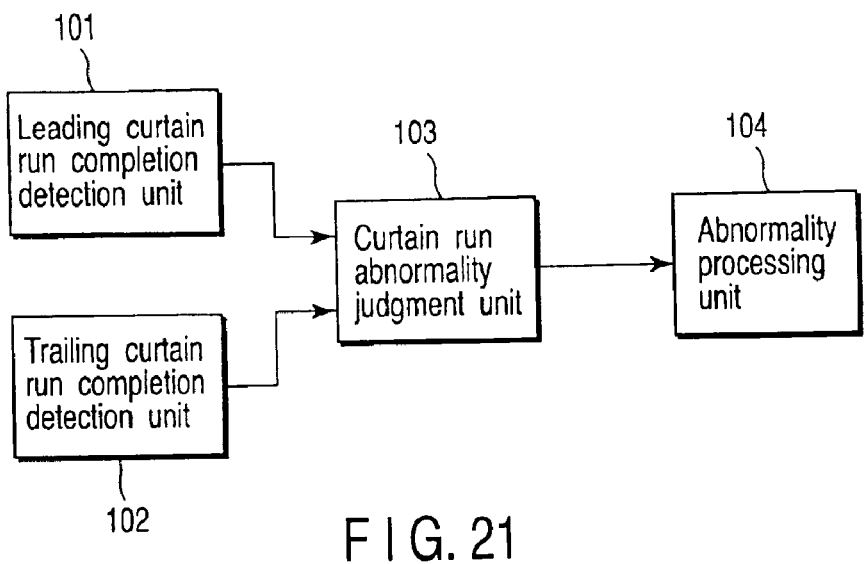
FIG. 21 is a block diagram schematically showing the shutter abnormality detection apparatus for the camera according to a second embodiment of the present invention.

FIG. 21 is a block diagram of the shutter abnormality detection apparatus for the camera according to the second embodiment of the present invention. A leading curtain run completion detection unit 101 is a unit for detecting the run completion of the leading curtain of the focal plane shutter. A trailing curtain run completion detection unit 102 is a unit for detecting the run completion of the trailing curtain of the focal plane shutter. A curtain run abnormality judgment unit 103 is a unit for judging whether or not the curtain has normally run based on the outputs of the leading curtain run completion detection unit 101 and trailing curtain run completion detection unit 102. An abnormality processing unit 104 is a unit for performing abnormality processing suck as operation lock based on the judgment of the curtain run abnormality judgment unit 103, when the running of the curtain is judged to be abnormal.

Figure 22:
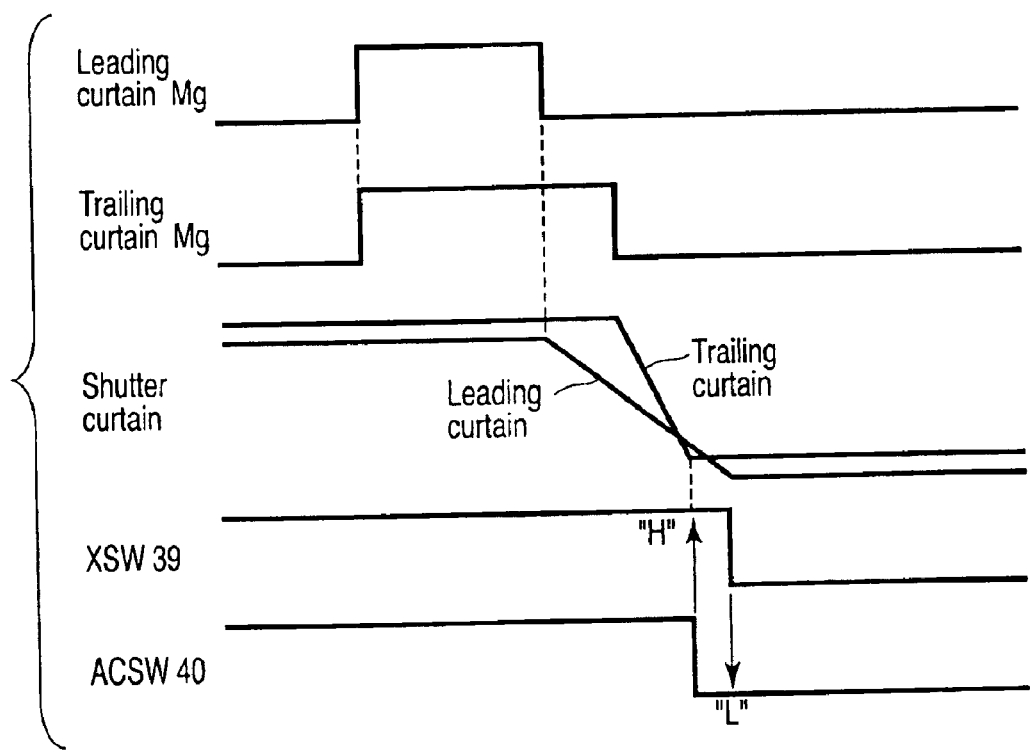
FIG. 22 is a time chart showing a state of each component at a time when the abnormality is generated in the shutter.

FIG. 22 is a time chart showing the state of each component at a time when the abnormality is generated in the shutter. Here, the state of a case in which a curtain speed abnormality is generated is shown. Since the time chart at the normal time has already been described with reference to FIG. 3, only a portion different from that of the operation at the normal time will be described. The shutter curtain is urged in one direction by the urging force of the spring (or the equivalent), and engaged by the adsorption of the magnet. When the adsorption of the magnet is turned off at the run time, the engagement is released, and the curtain runs by the urging force.

There is a case in which some disadvantage or deterioration in this urging force and abnormality is generated in the run speed (curtain speed) of the shutter curtain.

FIG. 22 shows the time chart in which the leading curtain runs at the low speed (or the trailing curtain runs at the high speed) and the trailing curtain runs ahead of the leading curtain. In FIG. 22, a time (leading curtain run time) from when the leading curtain magnet turns off until the XSW 39 turns on, or a time (trailing curtain run time) from when the trailing curtain magnet turns off until the ACSW 40 turns on indicates an abnormal value as compared with the normal value. It is also noted that the logic of the XSW 39 is "H", when the ACSW 40 falls. Alternatively, the logic of the ACSW 40 is "L", when the XSW 39 falls. On the other hand, at the normal time of FIG. 3, when the ACSW 40 falls, the logic of the XSW 39 is "L". When the XSW 39 falls, the logic of the ACSW 40 is "H". In this case, when the running of the shutter curtain is normal and when the abnormality is generated in the running of the shutter curtain, a logic relation between the XSW 39 and ACSW 40 differs. Therefore, the abnormality of the shutter curtain can easily be detected.

Moreover, as shown in FIG. 22, when the leading curtain runs at the low speed (or the trailing curtain runs at the high speed), and the trailing curtain runs ahead of the leading curtain, the falling timing of the XSW 39 is behind the falling timing of the ACSW 40. Therefore, noting this, the abnormality of the shutter curtain may also be detected.

FIG. 23 is a flowchart showing details of the step S7 (exposure operation) of FIG. 11. The process of FIG. 23 corresponds to the time chart of FIG. 22.

First, the leading and trailing curtain magnets are turned on to engage the leading and trailing curtains (step S220). Accordingly, the shutter charge is completed, and the run preparation completion state is obtained. Next, the up driving of the movable mirror 14 and close-driving of the diaphragm mechanism 12 to a set position are carried out (step S221). This process is performed until a mirror up completion signal (MUSW 37 indicates "L") is observed (step S222). Here, to cancel the chattering of the MUSW 37, the logic of the MUSW 37 is read a plurality of times at the predetermined time (about 100 $\mu$s) interval. When the logic is the same a plurality of times, this logic is decided. This method may be used (not shown in the drawing).

Next, it is judged whether or not the stroboscopic circuit 33 is in a mode of flat emission (step S223). This flat emission is a light emitting system strobe emission is maintained from the start of a shutter opening operation until the closing. As compared with a light emitting system in which flash light is only momentarily emitted during the opening, there is a merit that the light can be emitted at a total shutter speed, but there is a demerit in which emission control is very complicated during the opening. This is because the light is requested to be constantly emitted with the same brightness during the opening.

Therefore, when the following shutter damage is detected even during the flat emission, a large load is imposed upon the CPU 35. Therefore, in the flat emission, the following shutter damage detection is not carried out.

When the flat emission is judged not to be carried out in step S223, port interrupt of the XSW 39 and ACSW 40 is permitted (step S224). Accordingly, the process can shift to an interrupt routine described later in synchronization with each switch falling. Next, the leading curtain magnet is turned off to start the running of the leading curtain (step S225).

Next, the process is on standby until the time (exposure time) corresponding to the shutter speed calculated in the step S3 of FIG. 11 elapses (step S226). When the exposure time elapses, the trailing curtain magnet is turned off to start the running of the trailing curtain (step S227).

Next, it is judged whether or not the failings of both the XSW 39 and ACSW 40 have already been detected (step S228). When the failings have not been detected, the process waits until both the failings are detected. During the standby, the process shifts to the interrupt routine to carry out processing described later. That is, in the next step S229, the port interrupt of the XSW 39 and ACSW 40 is prohibited. This is because the detection has already ended. Next, during the interrupt routine described later, it is judged whether or not the shutter damage flag has been set (step S230). Here, when the flag is set, the non-exposure results. Therefore, the process shifts to step S233. When the flag is not set, the shutter is normal, and the process shifts to step S231.

In the step S231, as described with reference to FIG. 3, the process waits until the predetermined time elapses from when the trailing curtain magnet is turned off. This is a sufficient time for the trailing curtain to complete the running. Next, the down driving of the movable mirror 14 and driving of the diaphragm mechanism 12 to a fully open position are carried out (step S232).

On the other hand, in step S233, the down driving of the movable mirror 14 and driving of the diaphragm mechanism 12 to a fully open position are carried out in the same manner as in step S232. Next, the shutter is charged (step S234), and the damage lock process is carried out. To escape from this lock state, the process is restarted by the operation of the main switch or the inserting/detaching of the battery (not shown). Accordingly, the process is restarted from the step S212 of FIG. 23.

It is to be noted that a routine in which the flat emission is judged to be performed in the step S223 is basically similar to the above-described routine in which the flat emission is not carried out. That is, step S235 is similar to the step S225, step S236 is similar to the step S226, and step S237 is similar to the step S227. In step S238, during the shutter opening, the flat emission is controlled with respect to the stroboscopic circuit 33. In the next step S239, the step S238 is repeatedly executed until the run completion of the trailing curtain is detected by the ACSW 40.

Figure 24:
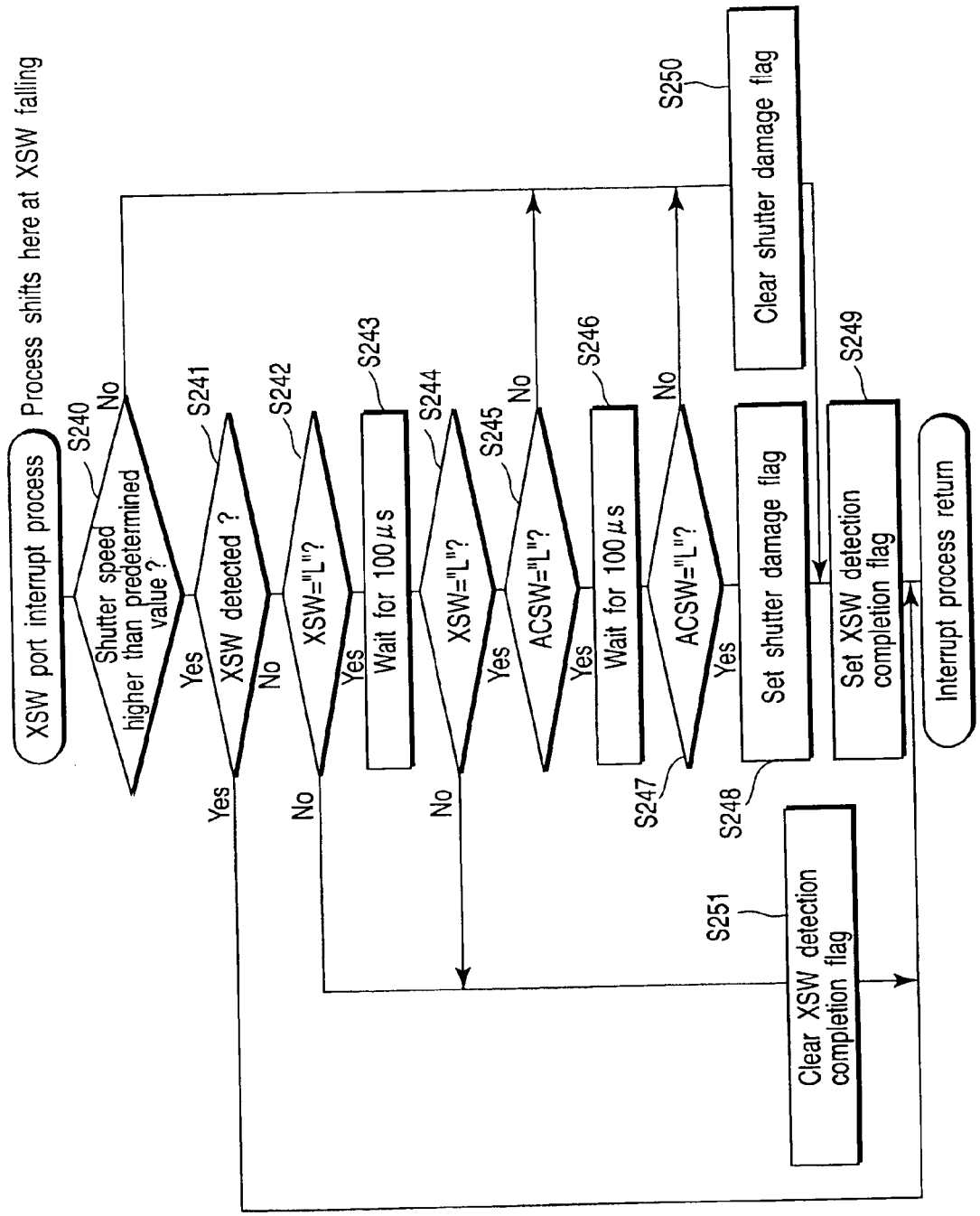
FIG. 24 is a flowchart showing details of a port interrupt process of an XSW 39 permitted in step S224 of FIG. 23.

FIG. 24 is a flowchart showing details of a port interrupt process of the XSW 39 permitted in the step S224 of FIG. 23. This is the interrupt routine to which the process shifts in synchronization with the falling of the XSW 39.

First, it is judged whether or not the shutter speed calculated in the step S3 of FIG. 11 is higher than a predetermined value (step S240). Here, when the speed is lower than the predetermined value, as described with reference to FIG. 22, the ACSW 40 does not turn on before the XSW 39. Moreover, at the low speed, there is not any problem, even when the curtain speed is disturbed. The process therefore advances to step S250. For the predetermined value, for example, when a curtain speed normal value of the shutter is 10 ms (10 ms from the run start until the run completion), the value may be about $\frac{1}{100}$ second equal to this time.

On the other hand, when the result of the judgment in the step S240 indicates the speed higher than the predetermined value, the process shifts to step S241. It is judged in the step S241 whether or not the XSW 39 has been detected based on an XSW detection completion flag set in step S240 described later. Since the flag is cleared in the beginning, the detection is not completed. When the detection is completed, the process returns.

In steps S242 to S244, assuming that a chatter killer time for ignoring the chattering is, for example, 100 µs, the logic of the XSW 39 is judged. When the logic of the XSW 39 is "H" continuously for 100 µs, the XSW 39 is not turned on yet (there is noise), and the process shifts to step S251.

In steps S245 to S247, when the XSW 39 indicates "L", the XSW 39 turns on. Therefore, the similar process is also carried out with respect to the ACSW 40. When the XSW 39 indicates "L", the ACSW 40 indicates "H". Then, the shutter is normal. Therefore, the process shifts to step S250. However, when the XSW 39 indicates "L", the ACSW 40 indicates "L", then the shutter is abnormal, and the process therefore advances to step S248 to set the shutter damage flag. In the next step S249, since the detection of the XSW 39 is completed, the XSW detection completion flag is set. This flag is used in the judgment of the steps S241 and S228.

Moreover, when the shutter is judged to be normal and the process advances to step S250, the shutter damage flag is cleared. Thereafter, the process shifts to step S249.

Furthermore, when the XSW 39 is judged not to be turned on yet in the step S242 or S244, the XSW detection completion flag is cleared (step S251), and the process returns.

Figure 25:
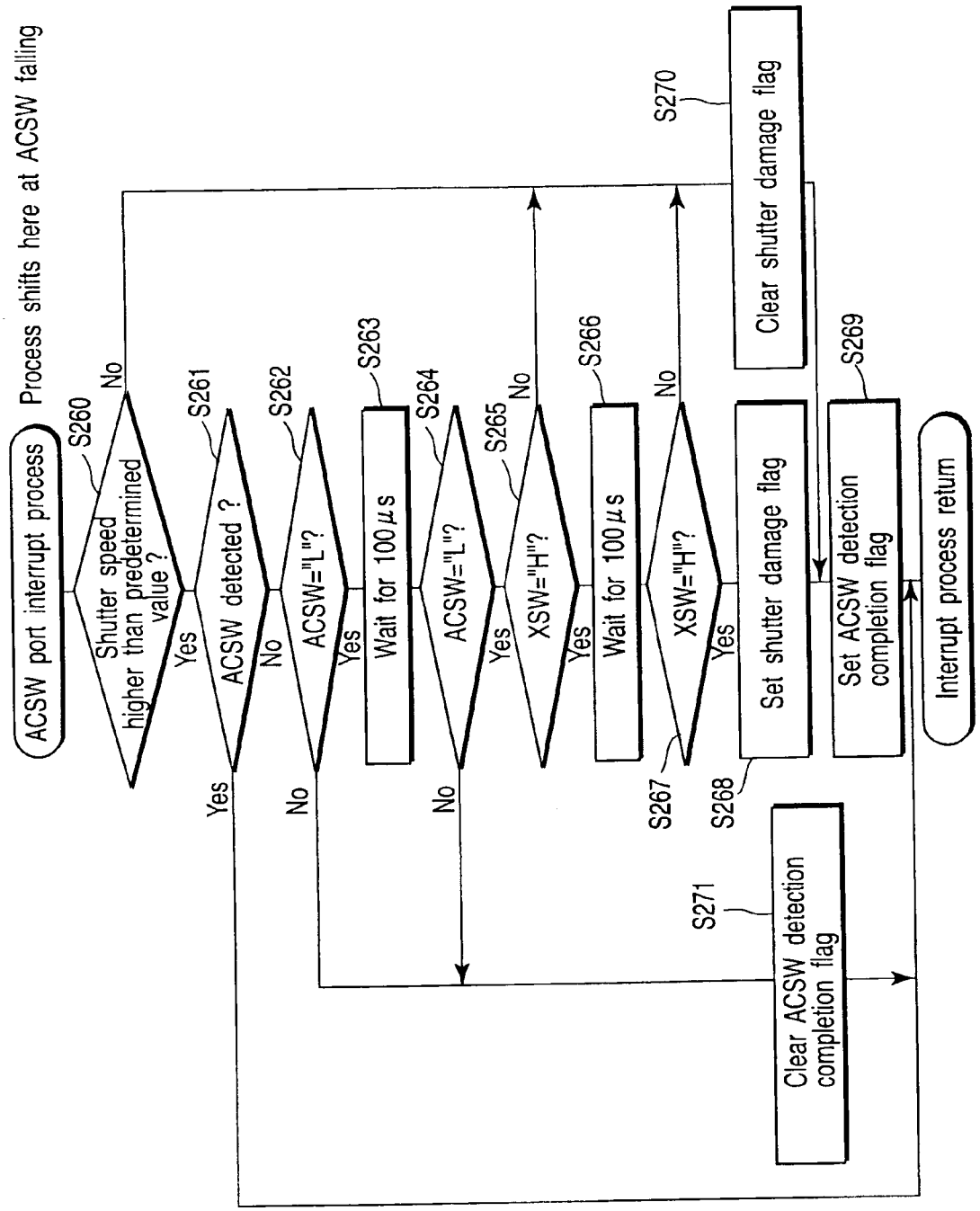
FIG. 25 is a flowchart showing details of the port interrupt process of the ACSW 40 permitted in the step S224 of FIG. 23.

FIG. 25 is a flowchart showing the details of the port interrupt process of the ACSW 40 permitted in the step S224 of FIG. 23. This is the interrupt routine to which the process shifts in synchronization with the falling of the ACSW 40.

First, it is judged whether or not the shutter speed calculated in the step S203 is higher than the predetermined value (step S260). Here, when the speed is lower than the predetermined value, as described with reference to FIG. 22, the ACSW 40 does not turn on before the XSW 39. At the low speed, there is not any problem, even when the curtain speed is disturbed. For the predetermined value, for example, when the curtain speed normal value of the shutter is 10 ms (10 ms from the run start until the run completion), the value may be about $\frac{1}{100}$ second equal to this time.

When the result of the judgment in the step S260 indicates the speed higher than the predetermined value, the process shifts to step S261. At the low speed, the process shifts to step S270. It is judged in the step S261 whether or not the ACSW has been detected based on an ACSW detection completion flag set in step S269 described later. Since the flag is cleared in the beginning, the detection is not completed. When the detection is completed, the process returns.

In steps S262 to S264, assuming that the chatter killer time for ignoring the chattering is, for example, 100 µs, the logic of the ACSW 40 is judged. When the logic of the ACSW 40 is "H" continuously for 100 µs, the ACSW 40 is not turned on yet (there is noise), and the process shifts to step S271.

In steps S265 to S267, when the ACSW 40 indicates "L", the ACSW 40 turns on. Therefore, the similar process is also carried out with respect to the XSW 39. When the ACSW 40 indicates "L", the XSW 39 indicates "L". Then, the shutter is normal. Therefore, the process shifts to step S270. However, when the ACSW 40 indicates "L", the XSW 39 indicates "H", then the shutter is abnormal, and the process therefore shifts to step S268.

In the step S268, the shutter damage flag is set. Next, since the detection of the ACSW 40 is completed, the ACSW detection completion flag is set (step S269). This flag is used in the judgment of the steps S261 and S228.

Moreover, when the shutter is judged to be normal and the process advances to step S270, the shutter damage flag is cleared. Thereafter, the process shifts to the step S249.

Furthermore, when the ACSW 40 is judged not to be turned on yet in the step S262 or S264, the ACSW detection completion flag is cleared (step S271), and the process returns.

According to the shutter abnormality detection apparatus for the camera of the present invention, the trouble of the non-exposure of the shutter can be detected by a simple method. Concretely, when the completion of the trailing curtain run occurs before that of the leading curtain run by the defect of the mechanism of the shutter, the non-exposure can be detected by the simple method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A shutter abnormality detection apparatus for a camera comprising a shutter including leading and trailing curtains which are shutter curtains electrically controlled to run, the apparatus comprising:

a curtain run detection unit which detects a run state of at least one of the leading and trailing curtains;

a curtain run time judgment unit which judges a run time of the shutter curtains based on an output from the curtain run detection unit; and an abnormality processing unit which notifies an abnormality state of the shutter curtains, when it is judged as a result of judgment in the curtain run time judgment unit that the curtain run time is abnormal;

wherein the said abnormality processing unit including an operation lock function which locks the subsequent operation of the camera, when the curtain run time is judged to be abnormal; and further comprising:

a return unit which returns the operation of the camera from the locked state in response to a predetermined operation, when the subsequent operation of the camera is locked by the abnormality processing unit;

a curtain run time recheck unit which again judges whether or not the run time of the shutter curtain is normal during the operation of return by the return unit; and a control unit which returns the operation of the camera to a normal operation, when the run time of the shutter curtain is judged to be normal as a result of judgment by the curtain run time recheck unit and which controls and locks the subsequent operation of the camera, when the run time of the shutter curtain is again judged to be abnormal.

2. The shutter abnormality detection apparatus for the camera according to claim 1, wherein the predetermined operation includes an operation of a power switch or an attachment/detachment operation of a power battery.

3. The shutter abnormality detection apparatus for the camera according to claim 1, wherein the curtain run time recheck unit controls the operation so that the trailing curtain starts running ahead of the leading curtain so as to prevent a useless exposure operation.

4. A shutter abnormality detection apparatus for a camera comprising a shutter including leading and trailing curtains which are electrically controlled to run, the apparatus comprising:

a leading curtain run detection unit which outputs a run completion signal of the leading curtain of the shutter;

a trailing curtain run detection unit which outputs the run completion signal of the trailing curtain of the shutter; and a shutter abnormality judgment unit which detects a state of the run completion signal outputted from the other curtain run detection unit based on the run completion signal from either one of the leading and trailing curtain run detection units and which judges abnormality of the shutter based on a detection result, wherein the shutter abnormality judgment unit judges that the shutter is abnormal, when the leading curtain run detection unit outputs a run incompletion signal at an output time of the run completion signal of the trailing curtain run detection unit or when the trailing curtain run detection unit outputs the run completion signal at the output time of the run completion signal of the leading curtain run detection unit.

5. A shutter abnormality detection apparatus for a camera comprising a shutter including leading and trailing curtains which are electrically controlled to run, the apparatus comprising:

a leading curtain run detection unit which outputs a run completion signal of the leading curtain of the shutter;

a trailing curtain run detection unit which outputs the run completion signal of the trailing curtain of the shutter; and a shutter abnormality judgment unit which detects a state of the run completion signal outputted from the other curtain run detection unit based on the run completion signal from either one of the leading and trailing curtain run detection units and which judges abnormality of the shutter based on a detection result, and further comprising:

a shutter speed calculation unit which calculates an opening time of the shutter based on an object luminance; and a prohibition unit which prohibits an operation of the shutter abnormality judgment unit, when the shutter speed is lower than a predetermined speed.

6. A shutter abnormality detection apparatus for a camera comprising a shutter including leading and trailing curtains which are shutter curtains electrically controlled to run, the apparatus comprising:

a first detection unit which detects a change of a level of a signal indicating a run state of the leading curtain of the shutter;

a second detection unit which detects the change of the level of the signal indicating the run state of the trailing curtain of the shutter; and a shutter abnormality judgment unit which compares a detection timing of the level change by the first detection unit with that of the level change by the second detection unit and which judges that the run of the shutter curtain is abnormal, when the detection timing of the level change by the second detection unit is earlier than that of the level change by the first detection unit.

7. A shutter abnormality detection apparatus for a camera comprising a shutter including leading and trailing curtains which are shutter curtains electrically controlled to run, the apparatus comprising:

a strobe unit which irradiates an object;

a shutter abnormality judgment unit which judges whether or not the shutter is abnormal based on a run state of the shutter curtain;

a flat light emitting unit which allows the strobe unit to emit light in a flat state from start of an opening operation of the shutter until the shutter is closed; and a prohibition unit which prohibits the operation of the shutter abnormality judgment unit, when the flat light emitting unit is controlled.

* * * * *